(12) United States Patent
Waldspurger et al.

(10) Patent No.: US 7,529,897 B1
(45) Date of Patent: May 5, 2009

(54) GENERATING AND USING CHECKPOINTS IN A VIRTUAL COMPUTER SYSTEM

(75) Inventors: Carl A. Waldspurger, Palo Alto, CA (US); Michael Nelson, Alamo, CA (US); Daniel J. Scales, Mountain View, CA (US); Pratap Subrahmanyam, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 520 days.

(21) Appl. No.: 10/750,919

(22) Filed: Dec. 31, 2003

(51) Int. Cl.
*G06F 12/16* (2006.01)
(52) U.S. Cl. .................. 711/162; 711/161; 714/6; 714/13
(58) Field of Classification Search ............ 711/161, 711/162; 714/6, 13
See application file for complete search history.

(56) References Cited

U.S. PATENT DOCUMENTS 5,778,418 A * 7/1998 Auclair et al. ............ 711/101
6,857,057 B2 * 2/2005 Nelson et al. ............ 711/203
2004/0010654 A1 * 1/2004 Yasuda et al. ............ 711/1

* cited by examiner

*Primary Examiner*—Sanjiv Shah
*Assistant Examiner*—Jae U Yu
(74) *Attorney, Agent, or Firm*—Darryl A. Smith

(57) ABSTRACT

To generate a checkpoint for a virtual machine (VM), first, while the VM is still running, a copy-on-write (COW) disk file is created pointing to a parent disk file that the VM is using. Next, the VM is stopped, the VM's memory is marked COW, the device state of the VM is saved to memory, the VM is switched to use the COW disk file, and the VM begins running again for substantially the remainder of the checkpoint generation. Next, the device state that was stored in memory and the unmodified VM memory pages are saved to a checkpoint file. Also, a copy may be made of the parent disk file for retention as part of the checkpoint, or the original parent disk file may be retained as part of the checkpoint. If a copy of the parent disk file was made, then the COW disk file may be committed to the original parent disk file.

28 Claims, 18 Drawing Sheets

GENERATING AND USING CHECKPOINTS IN A VIRTUAL COMPUTER SYSTEM

BACKGROUND OF THE INVENTION

1. Field of the Invention

This invention relates to virtual computer systems, and, in particular, to a system and method for generating a checkpoint for an active virtual machine and for executing a virtual machine from a previously generated checkpoint.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete," isolated computer.

The advantages of various types of checkpointing are also widely recognized, such as providing a backup of some aspect of a computer system and providing the ability to revert back to a previously generated checkpoint to undo changes to some aspect of a computer system or to recover from a failure affecting the computer system. One particular use of checkpointing that is advantageous is to capture the state of a long-running computation, so that, if the computation fails at some point, it can be resumed from the checkpointed state, instead of having to restart the computation from the beginning.

This invention relates to the generation and use of checkpoints for a virtual machine within a virtual computer system. Accordingly, virtual machine technology and checkpointing technology are both discussed below.

General Virtualized Computer System

As is well known in the field of computer science, a virtual machine (VM) is a software abstraction—a "virtualization"—of an actual physical computer system. FIG. 1 illustrates, in part, the general configuration of a virtual computer system 700, including a virtual machine 200, which is installed as a "guest" on a "host" hardware platform 100.

As FIG. 1 shows, the hardware platform 100 includes one or more processors (CPUs) 110, system memory 130, and one or more local storage devices, which typically includes a local disk 140. The system memory is typically some form of high-speed RAM (random access memory), whereas the disk (one or more) is typically a non-volatile, mass storage device. The hardware 100 also typically includes other conventional mechanisms such as a memory management unit (MMU) 150 and various registers 160. The hardware 100 may also include one or more interface cards for interfacing with external devices, computers, systems and/or networks. For example, the hardware 100 may include a data interface 170 for connecting to an external data storage device, system or network. As a more specific example, the data interface 170 may be one or more conventional host bus adapters (HBAs) for connecting to a conventional storage area network (SAN). Also, the hardware 100 may include a network interface 180 for connecting to a computer network. More specifically, the network interface 180 may be, for example, one or more conventional Ethernet controllers or network interface cards (NICs) for connecting to a conventional Ethernet network, which may further be connected to one or more additional networks of varying types.

Each VM 200 typically includes at least one virtual CPU 210, at least one virtual disk 240, a virtual memory system 230, a guest operating system 220 (which may simply be a copy of a conventional operating system), and various virtual devices 280, in which case the guest operating system ("guest OS") includes corresponding drivers 224. All of the components of the VM may be implemented in software using known techniques to emulate the corresponding components of an actual computer.

If the VM is properly designed, then it will not be apparent to the user that any applications 260 running within the VM are running indirectly, that is, via the guest OS and virtual processor. Applications 260 running within the VM will act just as they would if run on a "real" computer, except for a decrease in running speed that will be noticeable only in exceptionally time-critical applications. Executable files will be accessed by the guest OS from a virtual disk or virtual memory, which may simply be portions of an actual physical disk or memory allocated to that VM. Once an application is installed within the VM, the guest OS retrieves files from the virtual disk just as if they had been pre-stored as the result of a conventional installation of the application. The design and operation of virtual machines is well known in the field of computer science.

Some interface is usually required between a VM and the underlying host platform (in particular, the CPU), which is responsible for actually executing VM-issued instructions and transferring data to and from the actual memory and storage devices. A common term for this interface is a "virtual machine monitor" (VMM), shown as component 300. A VMM is usually a thin piece of software that runs directly on top of a host, or directly on the hardware, and virtualizes the resources of the physical host machine. Among other components, the VMM therefore usually includes device emulators 330, which may constitute the virtual devices 280 that the VM 200 accesses. The interface exported to the VM is then the same as the hardware interface of the machine, so that the guest OS cannot determine the presence of the VMM.

The VMM also usually tracks and either forwards (to some form of operating system) or itself schedules and handles all requests by its VM for machine resources, as well as various faults and interrupts. A mechanism known in the art as an exception or interrupt handler 355 is therefore included in the VMM. As is well known, such an interrupt/exception handler normally includes an interrupt descriptor table (IDT), or some similar table, which is typically a data structure that uses information in the interrupt signal to point to an entry address for a set of instructions that are to be executed when the interrupt/exception occurs.

Although the VM (and thus the user of applications running in the VM) cannot usually detect the presence of the VMM, the VMM and the VM may be viewed as together forming a single virtual computer. They are shown in FIG. 1 as separate components for the sake of clarity.

Moreover, the various virtualized hardware components such as the virtual CPU(s) 210, the virtual memory 230, the virtual disk 240, and the virtual device(s) 280 are shown as being part of the VM 200 for the sake of conceptual simplicity—in actual implementations these "components" are usually constructs or emulations exported to the VM by the VMM. For example, the virtual disk 240 is shown as being within the VM 200. This virtual component, which could alternatively be included among the virtual devices 280, may in fact be implemented as one of the device emulators 330 in the VMM.

The device emulators 330 emulate the system resources for use within the VM. These device emulators will then typically also handle any necessary conversions between the resources as exported to the VM and the actual physical resources. One advantage of such an arrangement is that the VMM may be set up to expose "generic" devices, which facilitate VM migration and hardware platform-independence. For example, the VMM may be set up with a device emulator 330 that emulates a standard Small Computer System Interface (SCSI) disk, so that the virtual disk 240 appears to the VM 200 to be a standard SCSI disk connected to a standard SCSI adapter, whereas the underlying, actual, physical disk 140 may be something else. In this case, a standard SCSI driver is installed into the guest OS 220 as one of the drivers 224. The device emulator 330 then interfaces with the driver 224 and handles disk operations for the VM 200. The device emulator 330 then converts the disk operations from the VM 200 to corresponding disk operations for the physical disk 140.

Virtual and Physical Memory

As in most modern computers, the address space of the memory 130 is partitioned into pages (for example, in the Intel x86 architecture) or other analogous units. Applications then address the memory 130 using virtual addresses (VAs), which include virtual page numbers (VPNs). The VAs are then mapped to physical addresses (PAs) that are used to address the physical memory 130. (VAs and PAs have a common offset from a base address, so that only the VPN needs to be converted into a corresponding physical page number (PPN).) The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in other architectures where relocatability is possible.

An extra level of addressing indirection is typically implemented in virtualized systems in that a VPN issued by an application 260 in the VM 200 is remapped twice in order to determine which page of the hardware memory is intended. The first mapping is provided by a mapping module within the guest OS 220, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory must ultimately be generated. A memory management module 350, located typically in the VMM 300, therefore performs the second mapping by taking the GPPN issued by the guest OS 220 and mapping it to a hardware (or "machine") page number PPN that can be used to address the hardware memory 130. This GPPN-to-PPN mapping may instead be done in the main system-level software layer (such as in a mapping module in a kernel 600, which is described below), depending on the implementation. From the perspective of the guest OS, the GVPN and GPPN might be virtual and physical page numbers just as they would be if the guest OS were the only OS in the system. From the perspective of the system software, however, the GPPN is a page number that is then mapped into the physical memory space of the hardware memory as a PPN.

System Software Configurations in Virtualized Systems

In some systems, such as the Workstation product of VMware, Inc., of Palo Alto, Calif., the VMM is co-resident at system level with a host operating system. Both the VMM and the host OS can independently modify the state of the host processor, but the VMM calls into the host OS via a driver and a dedicated user-level application to have the host OS perform certain I/O (input/output) operations on behalf of the VM. The virtual computer in this configuration is thus fully hosted in that it runs on an existing host hardware platform and together with an existing host OS.

In other implementations, a dedicated kernel takes the place of and performs the conventional functions of the host OS, and virtual computers run on the kernel. FIG. 1 illustrates a kernel 600 that serves as the system software for several VM/VMM pairs 200/300, . . . , 200N/300N. Compared with a system in which VMMs run directly on the hardware platform, use of a kernel offers greater modularity and facilitates provision of services that extend across multiple VMs (for example, for resource management). Compared with the hosted deployment, a kernel may offer greater performance because it can be co-developed with the VMM and be optimized for the characteristics of a workload consisting of VMMs. The ESX Server product of VMware, Inc., has such a configuration.

A kernel-based virtualization system of the type illustrated in FIG. 1 is described in U.S. patent application Ser. No. 09/877,378 ("Computer Configuration for Resource Management in Systems Including a Virtual Machine"), which is incorporated here by reference. The main components of this system and aspects of their interaction are, however, outlined below.

At boot-up time, an existing operating system 420 may be at system level and the kernel 600 may not yet even be operational within the system. In such case, one of the functions of the OS 420 may be to make it possible to load the kernel 600, after which the kernel runs on the native hardware 100 and manages system resources. In effect, the kernel, once loaded, displaces the OS 420. Thus, the kernel 600 may be viewed either as displacing the OS 420 from the system level and taking this place itself, or as residing at a "sub-system level." When interposed between the OS 420 and the hardware 100, the kernel 600 essentially turns the OS 420 into an "application," which has access to system resources only when allowed by the kernel 600. The kernel then schedules the OS 420 as if it were any other component that needs to use system resources.

The OS 420 may also be included to allow applications unrelated to virtualization to run; for example, a system administrator may need such applications to monitor the hardware 100 or to perform other administrative routines. The OS 420 may thus be viewed as a "console" OS (COS) or a "service console," which is analogous to "service processor" hardware for performing setup and diagnostic functions. In such implementations, the kernel 600 preferably also includes a remote procedure call (RPC) mechanism to enable communication between, for example, the VMM 300 and any applications 430 installed to run on the COS 420.

Actions

In kernel-based systems such as the one illustrated in FIG. 1, there must be some way for the kernel 600 to communicate with the VMM 300. In general, the VMM 300 can call into the kernel 600 but the kernel cannot call directly into the VMM. The conventional technique for overcoming this is for the kernel to post "actions" (requests for the VMM to do something) on an action queue stored in memory 130. As part of the VMM code, the VMM looks at this queue periodically, and always after it returns from a kernel call and also before it resumes a VM. One typical action is the "raise interrupt" action: If the VMM sees this action it will raise an interrupt to the VM 200 in the conventional manner.

As is known, for example, from U.S. Pat. No. 6,397,242 (Devine, et al., 28 May 2002), some virtualization systems allow VM instructions to run directly (in "direct execution") on the hardware CPU(s) when possible. When necessary, however, VM execution is switched to the technique known as "binary translation," during which the VM is running in the VMM. In any systems where the VM is running in direct execution when it becomes necessary for the VMM to check actions, the kernel must interrupt the VMM so that it will stop executing VM instructions and check its action queue. This may be done using known programming techniques.

Worlds

The kernel 600 handles not only the various VMM/VMs, but also any other applications running on the kernel, as well as the COS 420, as entities that can be separately scheduled on the hardware CPU(s) 110. In this disclosure, each schedulable entity is referred to as a "world," which contains a thread of control, an address space, machine memory, and handles to the various device objects that it is accessing. Worlds are stored in a portion of the memory space controlled by the kernel. More specifically, the worlds are controlled by a world manager, represented in FIG. 1 within the kernel 600 as module 612. Each world also has its own task structure, and usually also a data structure for storing the hardware state currently associated with the respective world.

There will usually be different types of worlds: 1) system worlds, which are used for idle worlds, one per CPU, and one or more helper worlds and other system worlds that perform tasks that, for example, need to be done asynchronously; 2) a console world, which is a special world that runs in the kernel and is associated with the COS 420; and 3) virtual machine worlds.

In the preferred embodiment, worlds generally run at the most-privileged level (for example, in a system with the Intel x86 architecture, this will be level CPL0), that is, with full rights to invoke any privileged CPU operations. A VMM, which, along with its VM, constitutes a separate world, therefore may use these privileged instructions to allow it to run its associated VM so that it performs just like a corresponding "real" computer, even with respect to privileged operations. User-level worlds may also be implemented, however, to isolate untrusted code to prevent any failure in the untrusted code from affecting the rest of the system.

Switching Worlds

When the world that is running on a particular CPU (which may be the only one) is preempted by or yields to another world, then a world switch has to occur. A world switch involves saving the context of the current world and restoring the context of the new world such that the new world can begin executing where it left off the last time that it was running.

The first part of the world switch procedure that is carried out by the kernel is that the current world's state is saved in a data structure that is stored in the kernel's data area. Assuming the common case of an underlying Intel x86 architecture, the state that is saved will typically include: 1) the exception flags register; 2) general purpose registers; 3) segment registers; 4) the instruction pointer (EIP) register; 5) the local descriptor table register; 6) the task register; 7) debug registers; 8) control registers; 9) the interrupt descriptor table register; 10) the global descriptor table register; and 11) the floating point state. Similar state information will need to be saved in systems with other hardware architectures.

After the state of the current world is saved, the state of the new world can be restored. During the process of restoring the new world's state, no exceptions are allowed to take place because, if they did, the state of the new world would be inconsistent upon restoration of the state. The same state that was saved is therefore restored. The last step in the world switch procedure is restoring the new world's code segment and instruction pointer (EIP) registers.

When worlds are initially created, the saved state area for the world is initialized to contain the proper information such that when the system switches to that world, then enough of its state is restored to enable the world to start running. The EIP is therefore set to the address of a special world start function. Thus, when a running world switches to a new world that has never run before, the act of restoring the EIP register will cause the world to begin executing in the world start function.

Switching from and to the COS world requires additional steps, which are described in U.S. patent application Ser. No. 09/877,378, mentioned above. Understanding the details of this process is not necessary for understanding the present invention, however, so further discussion is omitted.

Memory Management in Kernel-Based System

The kernel 600 includes a memory management module 616 that manages all machine memory that is not allocated exclusively to the COS 420. When the kernel 600 is loaded, the information about the maximum amount of memory available on the machine is available to the kernel, as well as information about how much of it is being used by the COS. Part of the machine memory is used for the kernel 600 itself and the rest is used for the virtual machine worlds.

Virtual machine worlds use machine memory for two purposes. First, memory is used to back portions of each world's memory region, that is, to store code, data, stacks, etc., in the VMM page table. For example, the code and data for the VMM 300 is backed by machine memory allocated by the kernel 600. Second, memory is used for the guest memory of the virtual machine. The memory management module may include any algorithms for dynamically allocating memory among the different VM's 200.

Interrupt and Exception Handling in Kernel-Based Systems

Interrupt and exception handling is related to the concept of "worlds" described above. As mentioned above, one aspect of switching worlds is changing various descriptor tables. One of the descriptor tables that is loaded when a new world is to be run is the new world's IDT. The kernel 600 therefore preferably also includes an interrupt/exception handler 655 that is able to intercept and handle (using a corresponding IDT in the conventional manner) interrupts and exceptions for all devices on the machine. When the VMM world is running, whichever IDT was previously loaded is replaced by the VMM's IDT, such that the VMM will handle all interrupts and exceptions.

The VMM will handle some interrupts and exceptions completely on its own. For other interrupts/exceptions, it will be either necessary or at least more efficient for the VMM to call the kernel to have the kernel either handle the interrupts/exceptions itself, or to forward them to some other sub-system such as the COS. One example of an interrupt that the VMM can handle completely on its own, with no call to the kernel, is a check-action IPI (inter-processor interrupt). One example of when the VMM preferably calls the kernel, which then forwards an interrupt to the COS, would be where the interrupt involves devices such as a mouse, which is typically controlled by the COS. The VMM may forward still other interrupts to the VM.

Device Access in Kernel-Based System

In the preferred embodiment of the invention, the kernel 600 is responsible for providing access to all devices on the physical machine. In addition to other modules that the designer may choose to load onto the system for access by the kernel, the kernel will therefore typically load conventional drivers as needed to control access to devices. Accordingly, FIG. 1 shows a module 610 containing loadable kernel modules and drivers. The kernel 600 may interface with the loadable modules and drivers in a conventional manner, using an application program interface (API) or similar interface.

Kernel File System

In the ESX Server product of VMware, Inc., the kernel 600 includes a fast, simple file system, referred to here as the VM kernel file system (VMFS), that has proven itself to be particularly efficient for storing virtual disks 240, which typically comprise a small number of large (at least 1 GB) files. By using very large file system blocks, the file system is able to keep the amount of metadata (that is, the data that indicates where data blocks are stored on disk) needed to access all of the data in a file to an arbitrarily small size. This allows all of the metadata to be cached in main memory so that all file system reads and writes can be done without any extra metadata reads or writes.

The VMFS in ESX Server may take up only a single disk partition, or it may span multiple partitions or LUNs (Logical Unit Numbers). When it is created, it sets aside space for the file system descriptor, space for file descriptor information, including the file name, space for block allocation information, and space for block pointer blocks. The vast majority of the partition's space is used for data blocks, whose size is set when the file system is created. The larger the partition size, the larger the block size should be in order to minimize the size of the metadata.

As mentioned earlier, the main advantage of the VMFS is that it ensures that all metadata may be cached in high-speed, main system memory. This can be done by using large data block sizes, with small block pointers. Since virtual disks are usually at least one gigabyte in size, using large block sizes on the order of 64 Megabytes will cause virtually no wasted disk space and all metadata for the virtual disk can be cached simultaneously in system memory.

Besides being able to always keep file metadata cached in memory, the other key to high performance file I/O is to reduce the number of metadata updates. Note that the only reason why the VMFS metadata will need to be updated is if a file is created or destroyed, or if it changes in size. Since these files are used primarily for virtual disks (or, for example, for copy-on-write redo logs), files are not often created or destroyed. Moreover, because virtual disks are usually fixed in size upon creation, the file size of a virtual disk does not usually change. In order to reduce the number of metadata updates on a virtual disk to zero, the system may therefore preallocate all data blocks for virtual disks when the file is created.

Checkpointing

A prior patent application owned by the assignee of this application describes, in a section labeled "Description of the Related Art," several different types of checkpointing. Specifically, U.S. patent application Ser. No. 09/497,978, entitled "Encapsulated Computer System" ("the '978 application"), which is incorporated here by reference, describes transactional disks, file system checkpointing, system checkpointing, and application/process-level checkpointing. Each of these techniques provides certain benefits to a computer user, such as the ability to at least partially recover from certain errors or system failures. However, each of these techniques also has significant limitations, several of which are described in the '978 application. For example, these techniques generally don't provide checkpointing for a complete, standard computer system.

In contrast, the '978 application discloses a system and method for extracting the entire state of a computer system as a whole, not just of some portion of the memory, which enables complete restoration of the system to any point in its processing without requiring any application or operating system intervention, or any specialized or particular system software or hardware architecture. The preferred embodiment described in the '978 application involves a VMM that virtualizes an entire computer system, and the VMM is able to access and store the entire state of the VM. To store a checkpoint, execution of the VM is interrupted and its operation is suspended. The VMM then extracts and saves to storage the total machine state of the VM, including all memory sectors, pages, blocks, or units, and indices and addresses allocated to the current VM, the contents of all virtualized hardware registers, the settings for all virtualized drivers and peripherals, etc., that are stored in any storage device and that are necessary and sufficient that, when loaded into the physical system in the proper locations, cause the VM to proceed with processing in an identical manner. After an entire machine state is saved, subsequent checkpoints may be created by keeping a log of changes that have been made to the machine state since a prior checkpoint, instead of saving the entire machine state at the subsequent checkpoint. In the preferred embodiment, when a subsequent checkpoint is stored, portions of the machine state that are small or that are likely to be entirely changed may be stored in their entirety, while for portions of the machine state that are large and that change slowly a log may be kept of the changes to the machine state.

The invention disclosed in the '978 application provides many advantages over the prior art. For example, saving the entire state of a complete, standard computer system facilitates complete system recovery from a wide variety of errors or failures, without having to modify the computer system to enable checkpointing. However, the invention of the '978 application still has a significant limitation. Namely, the method disclosed in the '978 application requires a substantial pause in the execution of the computer system to save the checkpoint. Such a pause in execution is unacceptable for many computer system implementations.

For example, suppose a commercial server application, such as a web server or a database server, is hosted on a conventional server computer system. Many such applications use relatively large amounts of system memory, such as 4 gigabytes of memory. Such a commercial server application may be executed within a VM, and the invention of the '978 application may be used to generate checkpoints for the VM, including the server application. To store a checkpoint according to the method of the '978 application, the operation of the VM is suspended while the machine state, including the system memory, is saved to persistent storage. Saving such large amounts of memory to persistent storage takes many seconds. In many implementations, suspending such a commercial server application for many seconds to store a checkpoint would simply not be tolerable, or would at least be undesirable. Thus, a system and method are needed for generating checkpoints for a computer system, where generating the checkpoint does not unduly interfere with the ongoing operation of the computer system.

SUMMARY OF THE INVENTION

One embodiment of the invention comprises a method for generating a checkpoint for a virtual machine (VM) in a virtual computer system. The VM uses a virtual disk and a set of VM memory. The method comprises: maintaining, in an unmodified state, the contents of the virtual disk at the time for which the checkpoint is generated, while allowing the VM to continue using the virtual disk; saving substantially all of the device state of the VM, at the time for which the checkpoint is generated, to a checkpoint data store; and saving the set of VM memory, at the time for which the checkpoint is generated, to the checkpoint data store. The step of saving the set of VM memory comprises: marking the set of VM memory as copy-on-write (COW), the set of VM memory constituting original VM memory; allowing the VM to continue using the VM memory; responding to memory COW faults related to the VM memory by generating copies of the original VM memory for read and write use by the VM; and saving the original VM memory to the checkpoint data store.

In another embodiment of the invention, the execution of the VM is stopped while the VM memory is marked COW. In another embodiment, the virtual disk is initially mapped to a parent disk file on a physical disk and the step of maintaining, in an unmodified state, the contents of the virtual disk comprises creating a copy-on-write (COW) disk file pointing to the parent disk file and mapping the virtual disk to the COW disk file. In another embodiment, the step of saving the device state of the VM to the checkpoint data store comprises saving the device state to memory while the VM is not executing and copying the device state from memory to the checkpoint data store after the VM has resumed execution.

Another embodiment of the invention also comprises a method for generating a checkpoint for a virtual machine (VM) in a virtual computer system. Again, the VM uses a virtual disk and a set of VM memory. In this embodiment, the method comprises: maintaining, in an unmodified state, the contents of the virtual disk at the time for which the checkpoint is generated, while allowing the VM to continue using the virtual disk, the unmodified contents of the virtual disk constituting a checkpointed virtual disk, and the contents of the virtual disk used by the VM constituting an ongoing virtual disk; saving substantially all of the device state of the VM, at the time for which the checkpoint is generated, to a checkpoint data store; saving the contents of the VM memory, at the time for which the checkpoint is generated, to the checkpoint data store, and allowing the VM to continue using the VM memory, the contents of the VM memory saved to the checkpoint data store constituting a checkpointed VM memory, and the contents of the VM memory as used by the VM constituting an ongoing VM memory; and allowing the VM to execute during at least a part of the time during which the checkpoint is being generated, and ensuring that the results of any pending disk writes are applied to both the checkpointed virtual disk and the ongoing virtual disk, that the results of any new disk writes are applied to the ongoing virtual disk, but not to the checkpointed virtual disk, that the results of any pending disk reads are applied to both the checkpointed VM memory and the ongoing VM memory, and that the results of any new disk reads are applied to the ongoing VM memory, but not to the checkpointed VM memory.

In another embodiment of the invention, the step of saving the contents of the VM memory to the checkpoint data store comprises: marking the set of VM memory as copy-on-write (COW), the set of VM memory constituting original VM memory; allowing the VM to continue using the VM memory; responding to memory COW faults related to the VM memory by generating copies of the original VM memory for read and write use by the VM; and saving the original VM memory to the checkpoint data store. In another embodiment, the step of ensuring that the results of any pending disk reads are applied to the ongoing VM memory comprises reissuing any pending disk reads for which the results of the read were directed to original VM memory for which a COW fault has occurred, but directing the reissued disk reads to the corresponding copies of the original VM memory instead of the original VM memory. In another embodiment, the step of ensuring that the results of any new disk reads are not applied to the checkpointed VM memory comprises forcing COW faults for any original VM memory that would otherwise be affected by the new disk reads. In another embodiment, the virtual disk is initially mapped to a parent disk file on a physical disk and the step of maintaining, in an unmodified state, the contents of the virtual disk comprises creating a copy-on-write (COW) disk file pointing to the parent disk file and mapping the virtual disk to the COW disk file. In still another embodiment, the step of ensuring that the results of any pending disk writes are applied to the ongoing virtual disk comprises, if there is a pending disk write to the same COW block group as a subsequent write for which a disk COW fault has occurred, delaying responding to the disk COW fault and delaying the subsequent write until the pending disk write completes.

Yet another embodiment of the invention also comprises a method for generating a checkpoint for a virtual machine (VM) in a virtual computer system. Here, the VM uses a parent disk file and a set of VM memory. The method comprises: (1) creating a copy-on-write (COW) disk file pointing to the parent disk file in use by the VM; (2) stopping the VM, and while the VM is stopped: (a) marking the memory of the VM copy-on-write, the VM memory constituting original VM memory, (b) saving substantially all of the device state of the VM to memory, and (c) switching the VM to use the COW disk file instead of the parent disk file; (3) resuming operation of the VM; (4) handling disk COW faults to the COW disk file; (5) handling memory COW faults to the original VM memory to generate copies of the original VM memory for read and write use by the VM; (6) saving the device state from memory to a checkpoint data store; and (7) saving the original VM memory to the checkpoint data store.

In another embodiment of the invention, the method further comprises the parent disk file after any pending disk writes complete, and using the copy of the parent disk file for the checkpoint. In another embodiment, the COW disk file is committed into the original parent disk file. In another embodiment, the step of committing the COW disk file into the original parent disk file comprises creating one or more new COW disk files for use by the VM while the COW disk file previously used by the VM is being committed. In another embodiment, the steps of creating the COW disk file and handling disk COW faults are performed by a data storage device that is external to the virtual computer system. In other embodiments, the checkpoint data store may comprise raw data or a file stored in a data storage medium. In other embodiments, the data storage medium may comprise a disk drive or a memory, such as either a high-speed RAM or a flash memory.

DETAILED DESCRIPTION

This invention may be implemented in a wide variety of virtual computer systems, based on a wide variety of different physical computer systems. A preferred embodiment of the invention is described in connection with a specific virtual computer system simply as an example of implementing the invention. The scope of the invention should not be limited to or by the exemplary implementation. In this case, the virtual computer system in which a first embodiment is implemented is the system 700 illustrated in FIG. 1, which may be substantially the same as the virtual computer system described in the '978 application.

Figure 1:
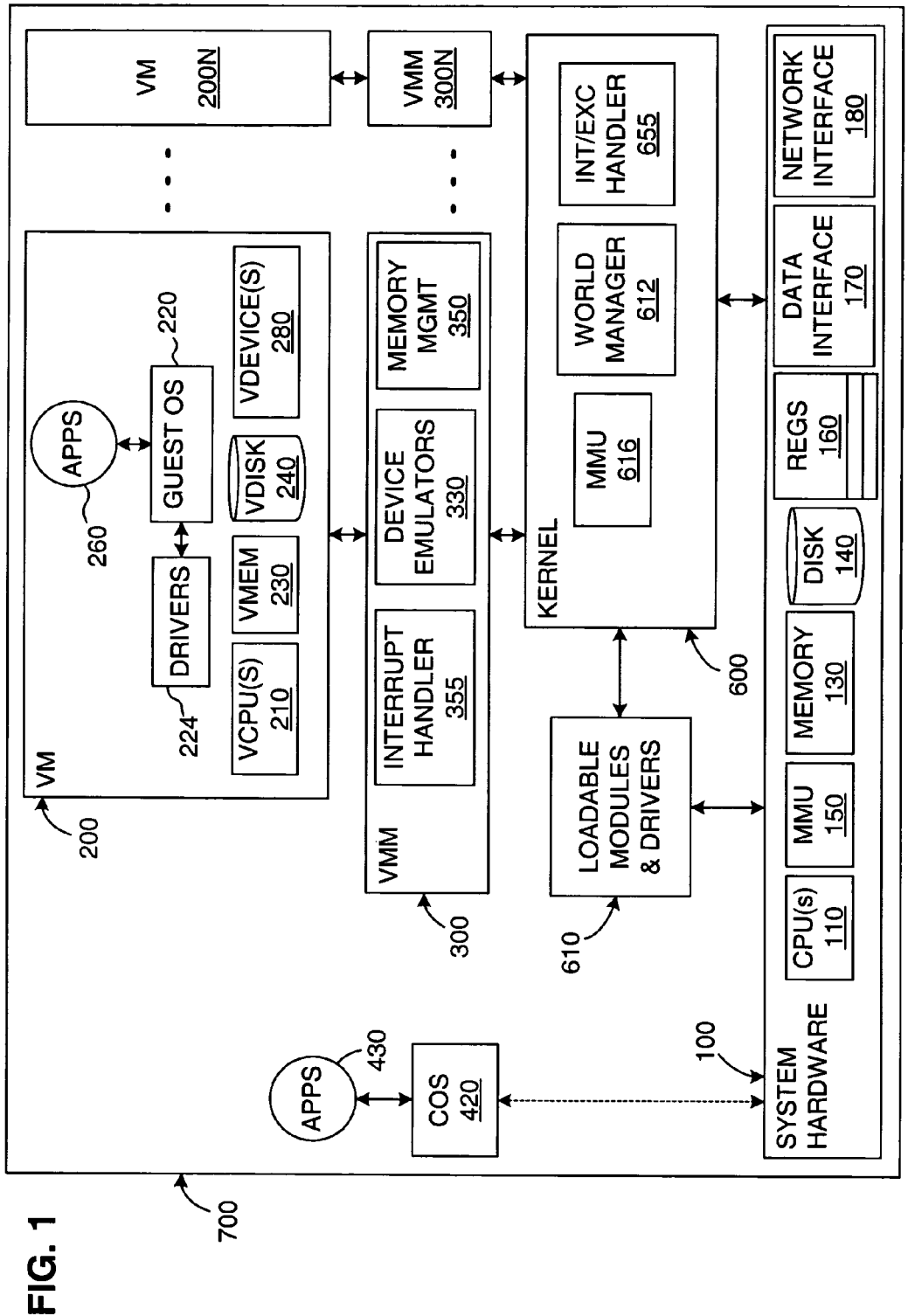
FIG. 1 illustrates the main components of a kernel-based, virtualized computer system.

FIGS. 2A-2H illustrate selected components of the virtual computer system 700 of FIG. 1, including illustrating some components in greater detail. The components illustrated in these figures are generally the components that are most relevant to implementing this invention. Other components of the system 700 are not illustrated in these figures for simplicity, but the other components of the system may be assumed. In particular, these figures do not illustrate the kernel 600 or the loadable modules and drivers 610, but these components may be assumed. Also, FIGS. 2A-2H only illustrate the single VM 200, but additional VMs may also be assumed. Each of the components illustrated in the FIGS. 2A-2H is substantially the same in all of the figures, except as described below.

Figure 2A:
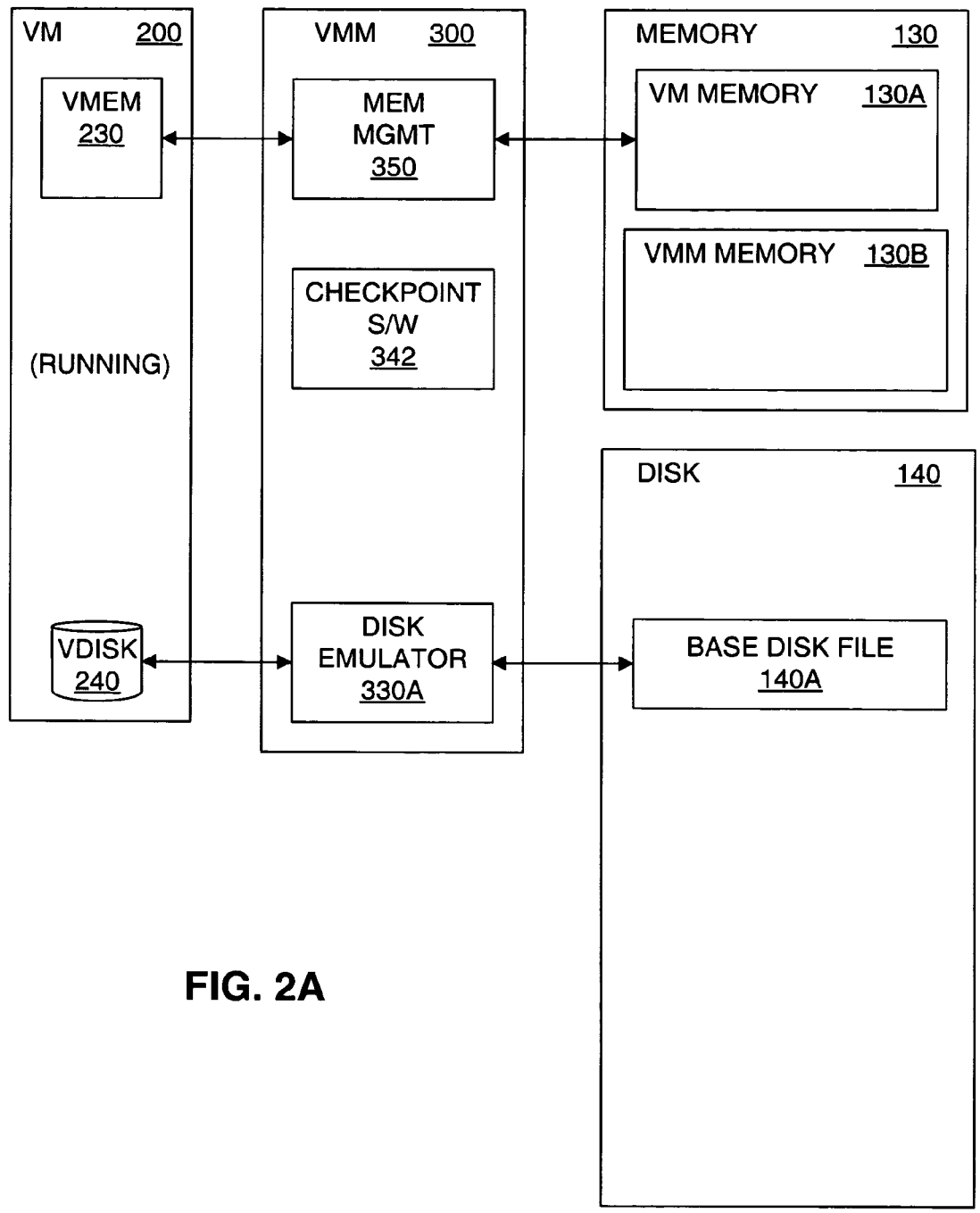
FIG. 2A illustrates the main components of a first embodiment of this invention at a first point in time, when a virtual machine is executing prior to the generation of a checkpoint.

At the highest level, FIG. 2A illustrates the VM 200, the VMM 300, the physical memory 130 and the physical disk 140. The VM 200 includes the virtual memory 230 and the virtual disk 240. The virtual memory 230 is mapped to a portion of the physical memory 130 by the memory management module 350 within the VMM 300, using any of various known techniques for virtualizing memory. The virtualization of the physical memory 130 is described in greater detail above. The portion of the physical memory 130 to which the virtual memory 230 is mapped is referred to as VM memory 130A. The physical memory 130 also includes a portion that is allocated for use by the VMM 300. This portion of the physical memory 130 is referred to as VMM memory 130B. The VM memory 130A and the VMM memory 130B each typically comprises a plurality of noncontiguous pages within the physical memory 130, although either or both of them may alternatively be configured to comprise contiguous memory pages. The virtual disk 240 is mapped to a portion, or all, of the physical disk 140 by the disk emulator 330A within the VMM 300, using any of various known techniques for virtualizing disk space. The disk emulator 330A is one of the device emulators 330 illustrated in FIG. 1. As described above, using the VMFS, the disk emulator 330A typically stores the virtual disk 240 in a small number of large files on the physical disk 140. The physical disk file that stores the contents of the virtual disk 240 is represented in FIG. 2A by a base disk file 140A. Although not shown in the figures for simplicity, the disk emulator 330A also has access to the VM memory 130A for performing data transfers between the physical disk 140 and the VM memory 130A. For example, in a disk read operation, the disk emulator 330A reads data from the physical disk 140 and writes the data to the VM memory 130A, while in a disk write operation, the disk emulator 330A reads data from the VM memory 130A and writes the data to the physical disk 140.

FIG. 2A also illustrates a checkpoint software unit 342 within the VMM 300. The checkpoint software 342 comprises one or more software routines that perform checkpointing operations for the VM 200, and possibly for other VMs. For example, the checkpoint software may operate to generate a checkpoint, or it may cause a VM to begin executing from a previously generated checkpoint. The routines that constitute the checkpoint software may reside in the VMM 300, the kernel 600, or in other software entities, or in a combination of these software entities, depending on the system configuration. Portions of the checkpoint software may also reside within software routines that also perform other functions. For example, one or more portions of the checkpoint software may reside in the memory management module 350 for performing checkpointing functions related to memory management, such as copy-on-write functions. The checkpoint software 342 may also or alternatively comprise a stand-alone software entity that interacts with the virtual computer system 700 to perform the checkpointing operations. Alternatively, the checkpoint software 342 may be partially implemented within the guest world of the virtual computer system. For example, the guest OS 220 or some other guest software entity may support the operation of the checkpoint software 342, which is primarily implemented within the virtualization software. The checkpoint software may take any of a wide variety of forms. Whichever form the software takes, the checkpoint software comprises the software that performs the checkpointing functions described in this application.

FIG. 2A shows the virtual computer system 700 when it is running prior to the initiation of an operation to generate a checkpoint. The generation of a checkpoint may be initiated automatically within the virtual computer system 700, such as on a periodic basis; it may be initiated by some user action, such as an activation of a menu option; or it may be initiated based on some other external stimulus, such as the detection of a drop in voltage of some power source, for example.

Figure 2B:
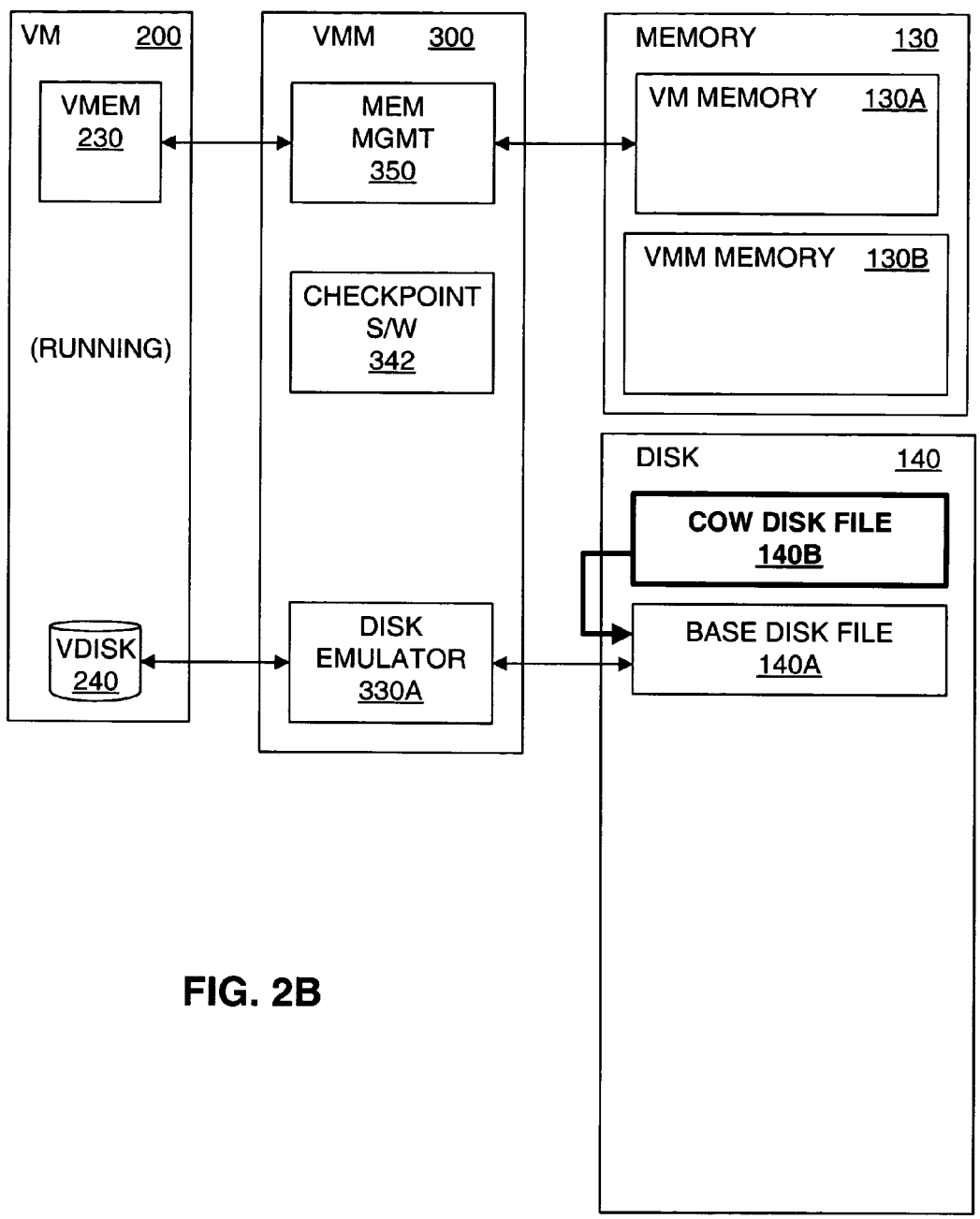
FIG. 2B illustrates the main components of the first embodiment at a second point in time, after the generation of a checkpoint has been initiated.
Figure 2C:
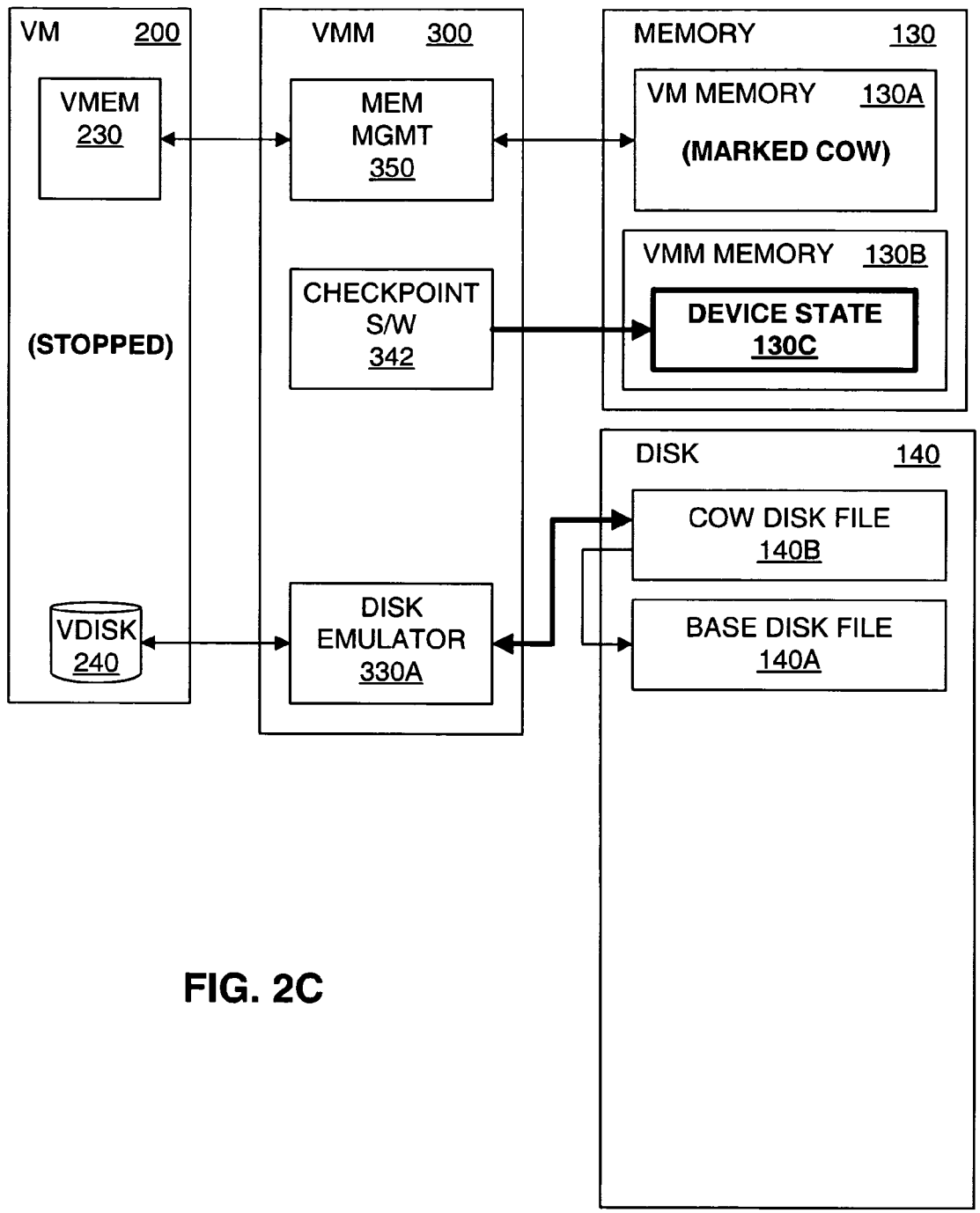
FIG. 2C illustrates the main components of the first embodiment at a third point in time, during the generation of the checkpoint.
Figure 2D:
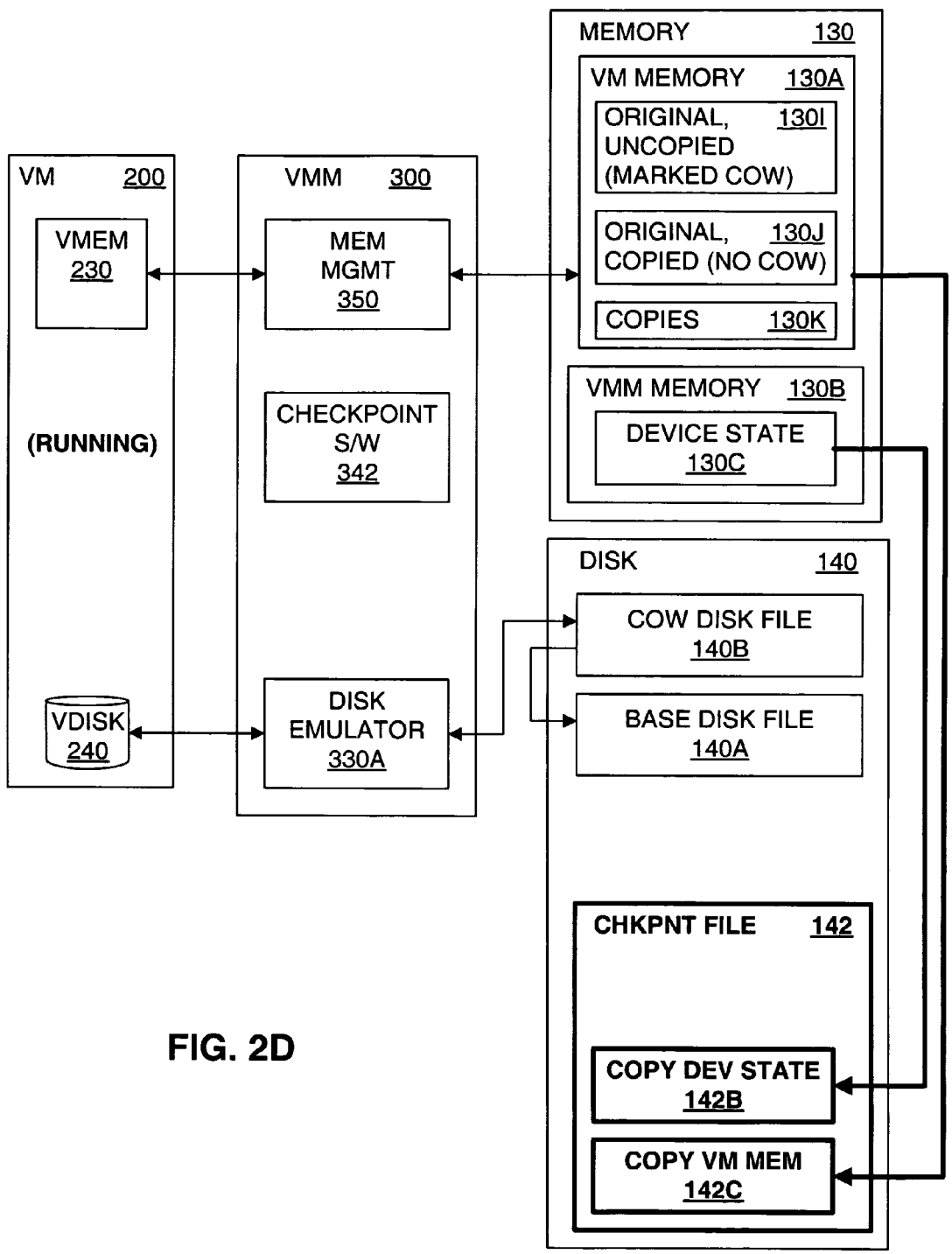
FIG. 2D illustrates the main components of the first embodiment at a fourth point in time, during the generation of the checkpoint.
Figure 2E:
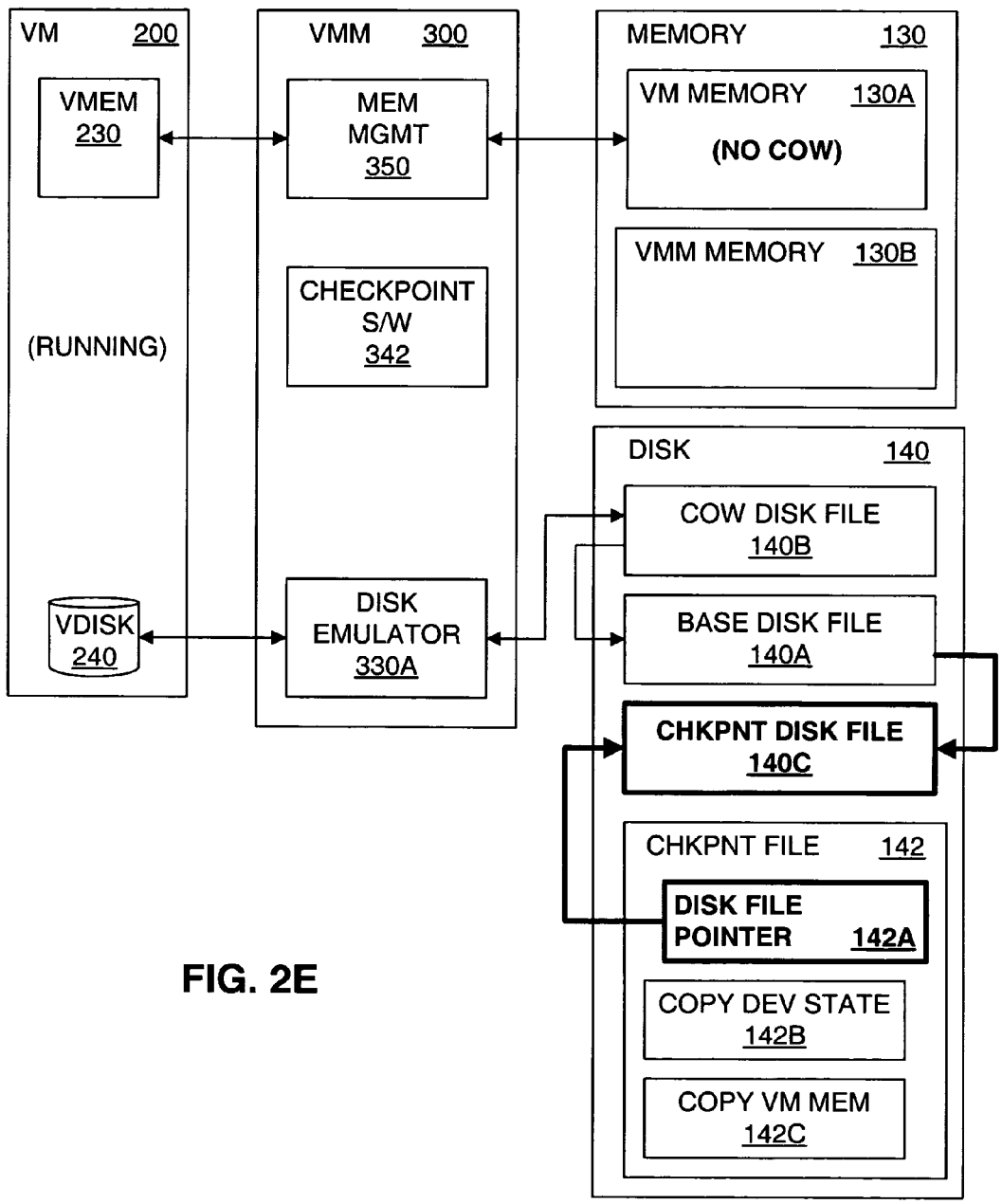
FIG. 2E illustrates the main components of the first embodiment at a fifth point in time, during the generation of the checkpoint, according to a first implementation.
Figure 2F:
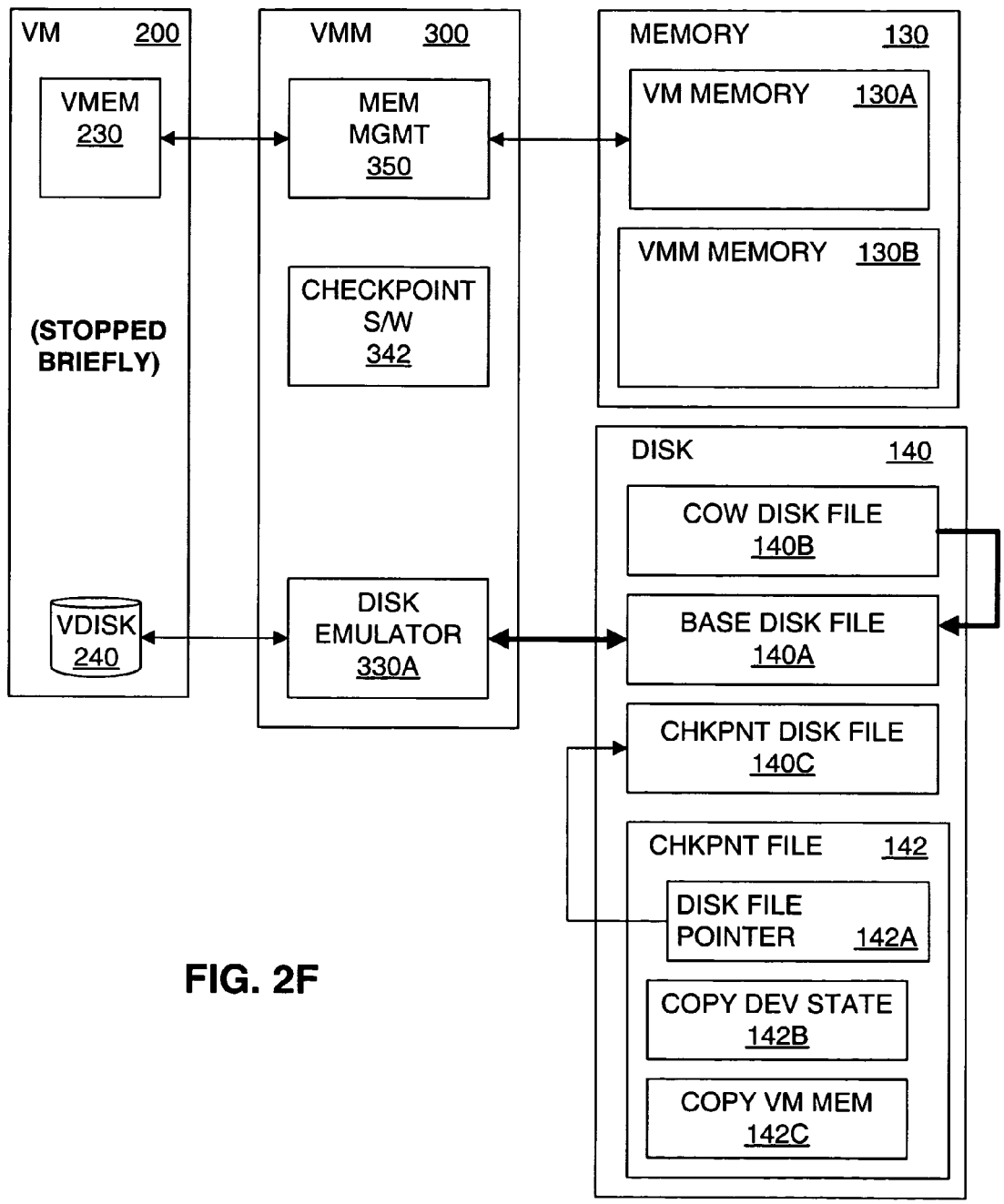
FIG. 2F illustrates the main components of the first embodiment at a sixth point in time, during the generation of the checkpoint, according to the first implementation.
Figure 2G:
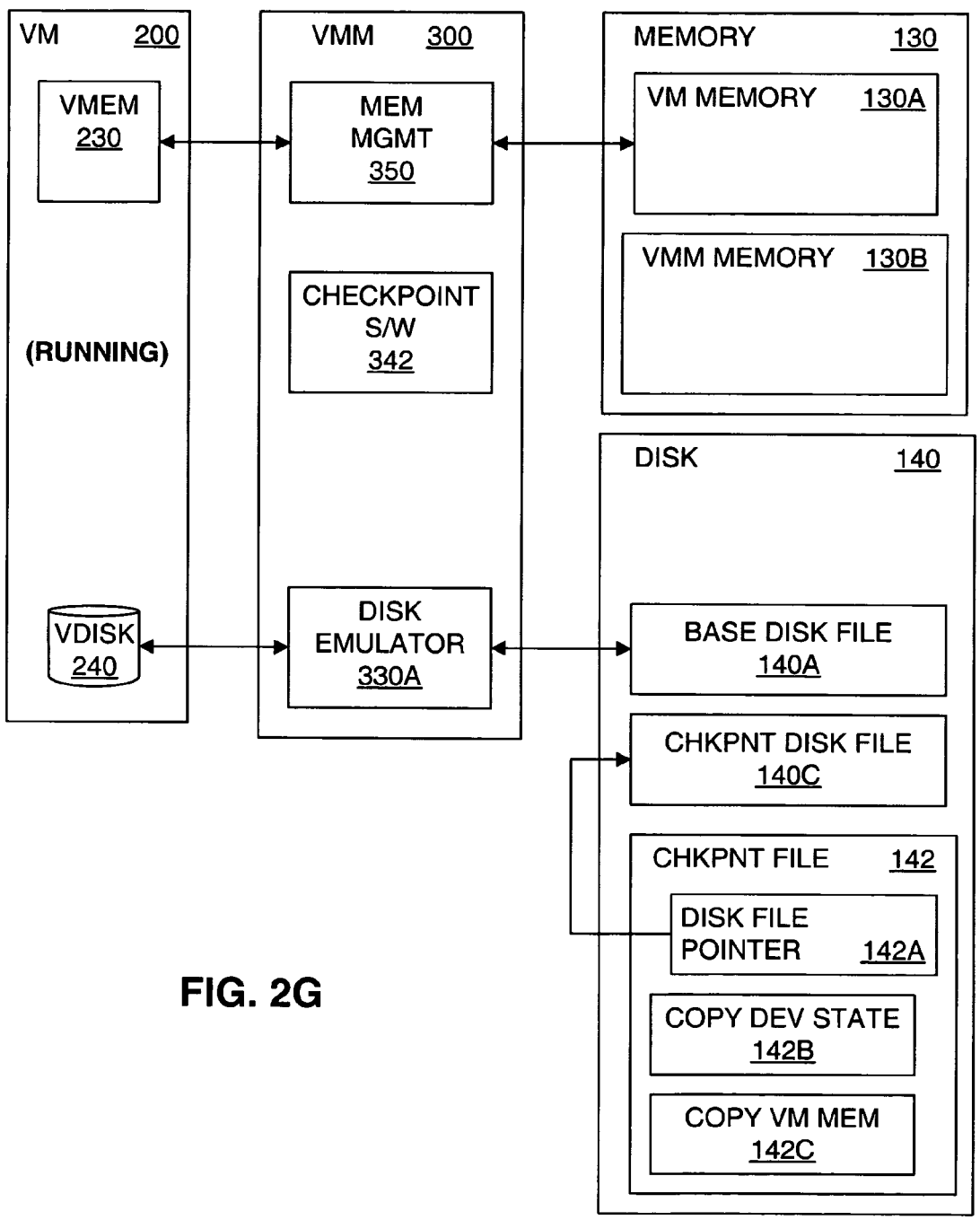
FIG. 2G illustrates the main components of the first embodiment at a seventh point in time, after the generation of the checkpoint has completed, according to the first implementation.
Figure 2H:
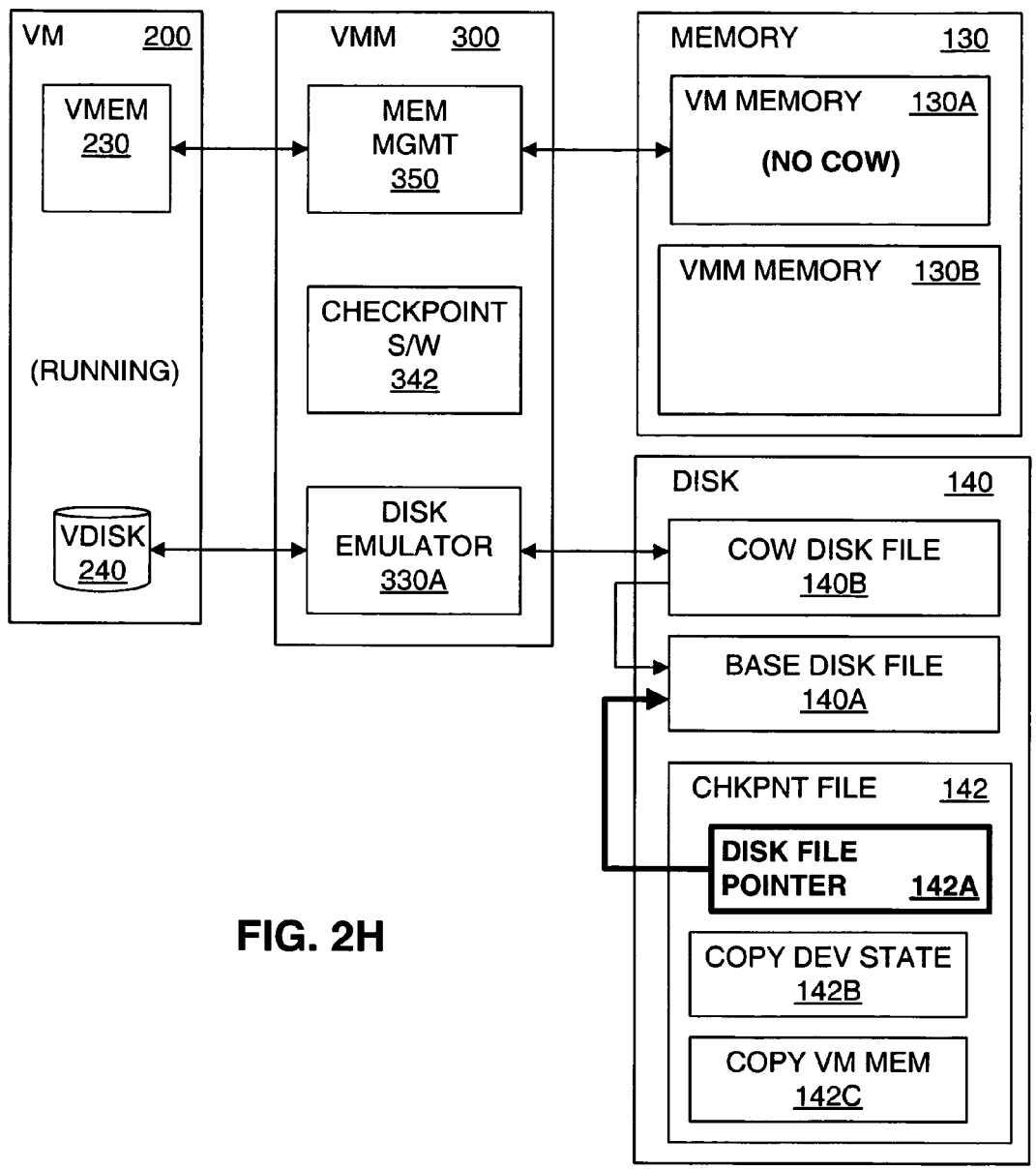
FIG. 2H illustrates the main components of the first embodiment after the generation of the checkpoint has completed, according to a second implementation.
Figure 3A:
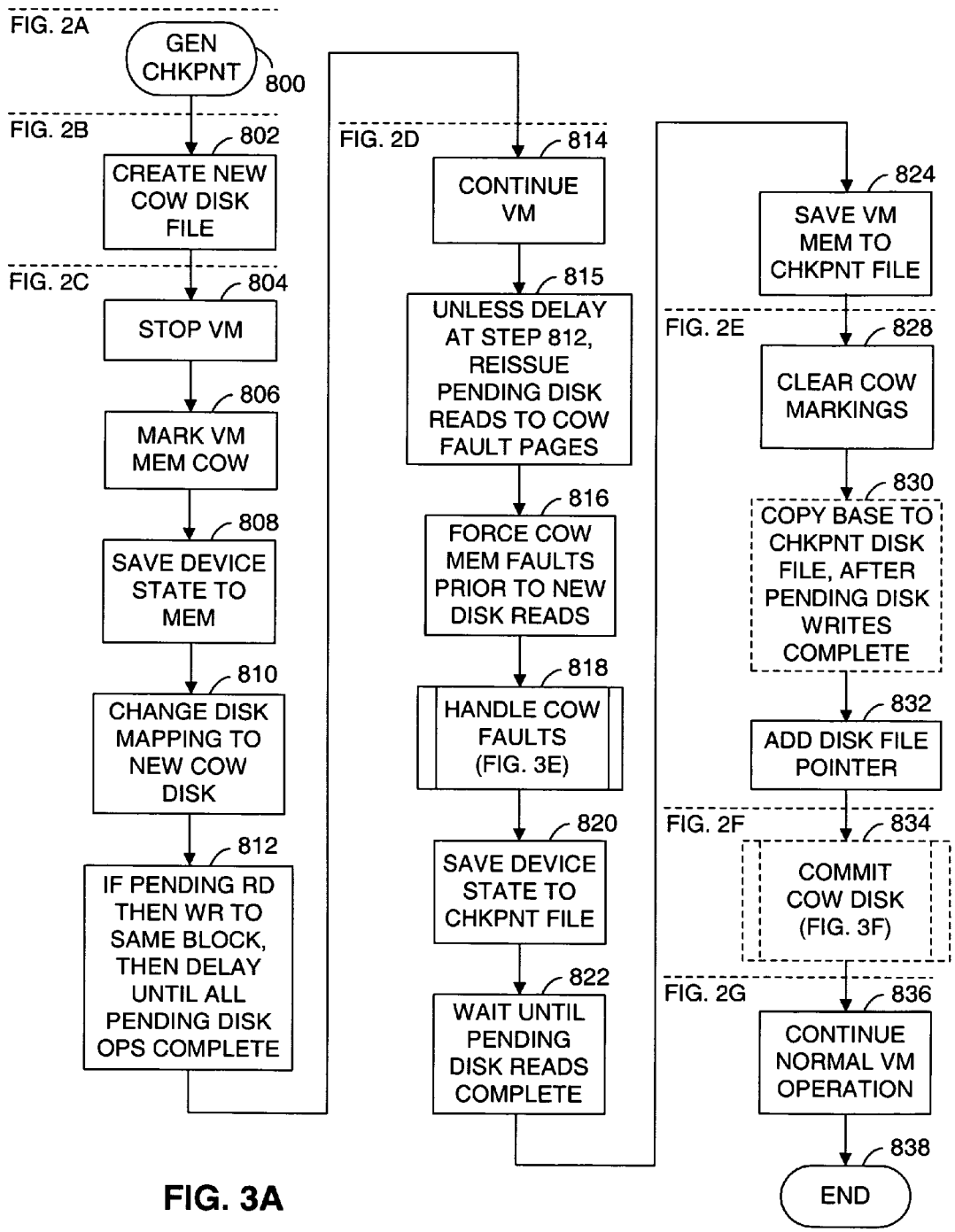
FIG. 3A illustrates a method that is used in the first embodiment of the invention to generate a checkpoint.

Once a checkpoint generation is initiated, the checkpoint software 342 begins running as a new task, process or thread within the virtual computer system, or the task becomes active if it was already running. The checkpoint software is executed along with the VM 200 in a common multitasking arrangement, and performs the method illustrated in FIG. 3A to generate the checkpoint. FIGS. 2B-2G illustrate the general state of the virtual computer system at different times during and after the generation of the checkpoint, according to a first implementation of the first embodiment of the invention. FIG. 2H illustrates the general state of the virtual computer system at the completion of the checkpoint, according to a second implementation of the first embodiment. Changes in the respective states of the components illustrated in FIGS. 2A-2H are generally highlighted in the figures by using bold text and/or thick lines. FIG. 3A illustrates both the first implementation and the second implementation of the first embodiment of the invention. The method of FIG. 3A for generating a checkpoint will now be described, with reference to FIGS. 2A-2H.

FIG. 3A begins at an initial step 800, when the operation to generate a checkpoint is initiated. FIG. 2A illustrates the state of the virtual computer system 700 at the step 800. Next, the method of FIG. 3A proceeds to a step 802. FIG. 2B illustrates the state of the virtual computer system 700 at the step 802. At the step 802, the checkpoint software 342 creates a new copy-on-write (COW) disk file 140B that references the base disk file 140A. Techniques for creating, using and maintaining COW files are well known in the art. As an alternative to this implementation of a COW disk file, a disk-based copy-on-write function may be implemented, such as a "snapshot" operation supported by many SAN systems and NAS (Network-Attached Storage) systems. As shown in parentheses within the block of the VM 200 in the FIG. 2B, the VM is still running during the step 802, when the COW disk file 140B is created. The new COW disk file is shown in FIG. 2B in bold text and thick lines to highlight the fact that the COW disk file is created at this point in time during the generation of the checkpoint. The thick line from the COW disk file 140B to the base disk file 140A indicates that the COW disk file references the base disk file. In other words, according to known copy-on-write techniques, the COW disk file initially contains no substantive content; instead, all of the substantive content for the COW disk file is contained in the base disk file, and the COW disk file contains pointers to the actual data in the base disk file. The operation of the COW disk file is described in greater detail below.

After the step 802, the method of FIG. 3A proceeds to a step 804. FIG. 2C illustrates changes to the state of the virtual computer system 700 from the step 804 through a step 812 of FIG. 3A. First, at the step 804, the execution of the VM 200 is stopped. The VM 200 is simply not given any execution cycles on the CPU(s) 110. Meanwhile, the checkpoint software 342 is still given execution time to continue with the method of FIG. 3A. In FIG. 2C, the stopped condition of the VM 200 is shown in parentheses, using bold text, within the block of the VM 200.

Next, at a step 806, the VM memory 130A is marked COW, as shown in parentheses, using bold text, within the block for the VM memory 130A in FIG. 2C. COW techniques for memory are also well known in the art. Although the general techniques are preferably modified for use in a virtual computer system, most of the same general principles apply. The primary modification relates to the fact that there is an extra level of address indirection in a virtual computer system, as described above.

Figure 3C:
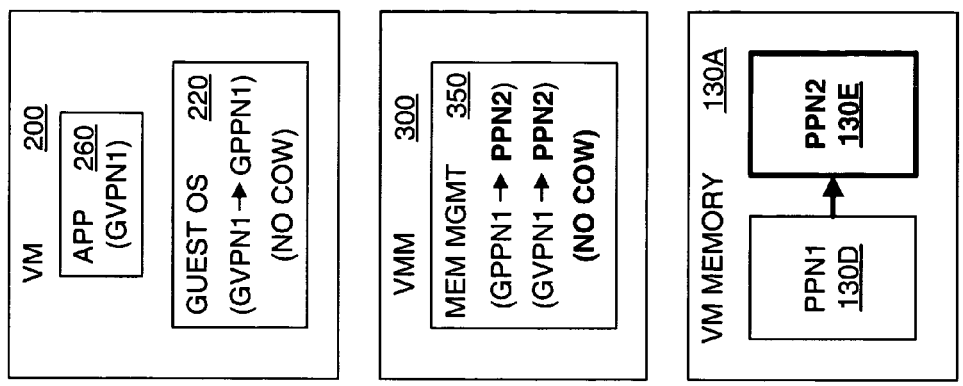
FIG. 3C illustrates the main components of the virtual computer system that are involved in using the physical memory page of FIG. 3B, after an attempt is made to write to the physical memory page.
Figure 3B:
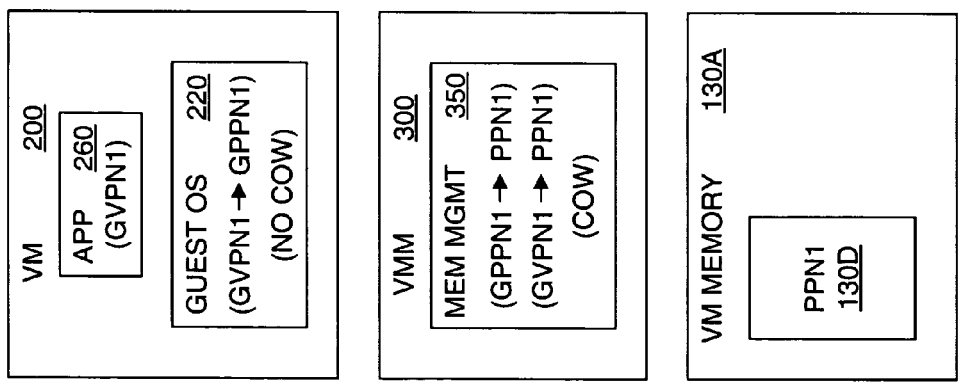
FIG. 3B illustrates the main components of the virtual computer system that are involved in using a physical memory page that is marked copy-on-write, prior to an attempted write to the physical memory page.

FIGS. 3B and 3C illustrate the COW techniques that are preferably used in the virtual computer system 700. FIGS. 3B and 3C illustrate the VM 200, including a guest application 260 and the guest OS 220; the VMM 300, including the memory management module (MMM) 350; and the VM memory 130A, including a first physical memory page 130D. FIG. 3C also illustrates a second physical memory page 130E within the VM memory 130A. FIG. 3B represents the state of the illustrated components when the first memory page 130D is marked COW, and before any attempted write to the page. FIG. 3C represents the changes that are made if an attempt is made to write to the first memory page 130D while it is marked COW.

As shown in FIG. 3B, the application 260 uses a GVPN, GVPN1, in a conventional manner to perform memory reads and writes. The guest OS 220 specifies a translation from GVPN1 to GPPN1, which the guest OS believes to be an actual physical memory page. Unlike typical COW implementations, the guest OS 220 does not mark the GPPN1 as being COW. In fact, the guest OS 220 preferably cannot even detect that any real physical memory pages are marked COW. As further shown in FIG. 3B, the MMM 350 uses the first memory page 130D to correspond with the GPPN1. Thus, the MMM 350 determines a translation from GPPN1 to PPN1. For the page table entries or translations that are loaded into a hardware TLB (Translation Look-aside Buffer), whether the translations are loaded by hardware or software, the MMM 350 further determines a translation from GVPN1 to PPN1.

Now the MMM 350 uses general COW techniques in translating from GPPNs to PPNs, and from GVPNs to PPNs. Thus, the MMM 350 marks the first memory page 130D as COW. If an attempt is made to write to the first memory page 130D, such as by the application 260 specifying a write to GVPN1, then a COW fault occurs. In response to the COW fault, the MMM 350 takes the actions illustrated in FIG. 3C. First, the MMM 350 copies the contents of the first memory page 130D to the second memory page 130E. Next, the MMM 350 changes the translations for GPPN1 and GVPN1 to specify the second memory page 130E, instead of the first memory page 130D. Thus, the translations loaded into the hardware TLB will indicate a translation from GVPN1 to PPN2. As is common practice in virtual memory systems, changing a translation that is loaded into the hardware TLB may require that the TLB be flushed or that an entry in the TLB be invalidated. The MMM 350 also removes the COW marking on the first memory page 130D. The translation maintained by the guest OS 220 for the GVPN1 continues to specify the GPPN1. At this point, if the guest application 260 attempts to access its memory page GVPN1, the guest OS 220 continues to map the attempted access to the GPPN1. However, the MMM 350, and hence the system hardware, now map the attempted access to the second memory page 130E, instead of the first memory page 130D. The first memory page 130D will remain unmodified from the point in time when it was marked as COW, so that it can be used for the generation of the checkpoint, as described further below. Meanwhile, the VM 200 is now able to read and write to the memory page that it refers to as GVPN1 or GPPN1, using the copied content in the second memory page 130E.

Returning to FIG. 3A, the method proceeds next to a step 808. At this point, the checkpoint software 342 copies the state of the VM 200 to the VMM memory 130B, as indicated in FIG. 2C as the device state 130C. The contents of the device state 130C will depend on the particular implementation of the virtual computer system in which the invention is implemented. The '978 application describes a "total machine state," which includes the contents of all virtualized hardware registers, the settings for all virtualized drivers and peripherals, etc., that are stored in any storage device and that are necessary and sufficient that, when loaded into the physical system in the proper locations, cause the VM to proceed with processing in an identical manner; where a "storage device" includes any device that is capable of storing data, including system memory, caches, non-volatile memory and mass storage devices such as hard disks. The device state 130C in this application is the same as the total machine state of the '978 application, except without the VM memory and the VM's disk file. According to this invention, the device state also includes a list of all "pending" disk operations and network operations. A "pending" disk operation is a disk read or write that was issued to the actual hardware before the VM 200 was stopped at the step 804, but for which the hardware has not yet reported completion of the entire request, including a response. A "pending" network operation is a network packet that has been issued to the hardware for transmission to an attached computer network, but for which the hardware has not yet reported a completed issuance. Again the saving of the device state 130C is highlighted in FIG. 2C using thick lines and bolded text.

Next, at a step 810, the checkpoint software 342 changes the configuration of the disk emulator 330A, so that the virtual disk 240 is now mapped to the COW disk file 140B, instead of the base disk file 140A. The method for reconfiguring the disk emulator 330A in this manner depends on the particular implementation, but it typically involves updating certain internal data structures within the emulation layer. Again, this change in the disk virtualization mapping is illustrated in FIG. 2C using a thick line. Now, once the VM 200 begins running again, any attempted access to the virtual disk 240 will be directed to the COW disk file 140B. The COW disk file will operate in accordance with known copy-on-write techniques. Thus, if a write is attempted to a block of the COW disk file for which there is a pointer to a corresponding block of the base disk file, the block of the base disk file is copied to the COW disk file, and the write is performed on the copy of the block in the COW disk file. If a write is attempted to a block that already exists in the COW disk file, the write is simply performed to that block. Similarly, if a read is attempted to a block that already exists in the COW disk file, the read is simply performed on that block. If a read is attempted to a block of the COW disk file for which there is a pointer to a corresponding block of the base disk file, the read is performed on the corresponding block of the base disk file.

Next, the method of FIG. 3A proceeds to the step 812. At this step, the checkpoint software 342 begins accounting for possible pending disk operations. Pending disk operations may take a substantial amount of time to complete, especially if the VM 200 happened to have issued a large number of disk operations just before the checkpoint generation was initiated. As a result, it is generally preferable, according to the invention, to proceed with the checkpoint generation without having to wait for pending disk operations to complete. At the same time, however, it may sometimes be necessary or advantageous to wait for some or all disk operations to complete.

One object of the invention is to generate a checkpoint for a first VM, which is running when the checkpoint is initiated and continues to run after the checkpoint is generated, without unduly interfering with the ongoing operation of the first VM. One technique of this invention for reducing the interference with the operation of the first VM is to enable the first VM to continue running for much of the time that the checkpoint is being generated. Generally, at the point in time at which a checkpoint is initiated, the state of the first VM is frozen and stored to disk, so that, at a later time, it is possible to cause the first VM to revert back to the checkpointed state, and resume operation from that point. At the same time, it is preferably also possible to cause one or more other VMs to begin execution at the checkpointed state of the first VM. When a checkpoint is initiated, and the VM for which the checkpoint has been initiated continues running, the state of the continuing VM generally diverges from the checkpointed state. In the preferred embodiment, the checkpointed state that is saved to disk is substantially the same state, or exactly the same state, as would be saved to disk if the VM were stopped upon initiation of the checkpoint, if pending disk operations were permitted to complete and if the entire VM device state were saved to disk, as described in the '978 application. At the same time, however, the state of the continuing VM is preferably substantially the same as if no checkpoint had been initiated at all, except for an acceptable delay in execution of the VM.

Pending disk operations are typically DMA (Direct Memory Access) operations that are set up by the CPU 110 and that are performed by a different hardware device, such as a disk controller. Suppose, for example, that the CPU 110 issues two separate DMA operations related to the physical disk 140 just before the generation of a checkpoint is initiated. Suppose the first disk operation is a read from a first data block of the base disk file 140A into a first memory page of the VM memory 130A, and the second disk operation is a write from a second memory page of the VM memory 130A into a second data block of the base disk file 140A. As described above, after the initiation of the checkpoint generation, the VM memory 130A is marked COW and a COW disk file 140B is created referencing the base disk file 140A. If a COW fault occurs on the first memory page of the VM memory 130A, then a copy of the first memory page is made for use by the continuing VM, while the original memory page is retained in an unmodified condition for use in generating the checkpoint. Similarly, if a COW fault occurs on the data block of the COW disk file 140B that corresponds with the second data block of the base disk file 140A, then a copy of the second data block of the base disk file is made in the COW disk file for use by the continuing VM, while the original data block is retained in an unmodified condition for use in generating the checkpoint.

Now the DMA operations were specified in terms of the base disk file 140A and the original pages of the VM memory 130A, not in terms of the COW disk file 140B or in terms of any copies of the VM memory pages that have resulted from COW faults. For the main embodiment described in this application, the virtual computer system 700 does not include an input/output memory management unit (IO-MMU) for providing virtual memory functions for I/O operations. For such systems that do not include an IO-MMU, the DMA operations are specified and performed entirely using physical memory addressing. The DMA operations are not subject to the virtual memory system implemented by the MMM 350. In particular, DMA writes to the VM memory 130A will not cause COW faults, even if a write is to a page that is marked COW. As a result, the first pending disk operation will cause the first data block of the base disk file 140A to be read into the first memory page of the VM memory 130A, regardless of whether the first memory page is marked COW. Similarly, the second pending disk operation will cause a write from the second memory page of the VM memory 130A into the second data block of the base disk file 140A, regardless of whether the second data block of the base disk file has yet been copied into the COW disk file as a result of a COW fault. As a result, as long as the first pending disk operation completes before the first memory page of the VM memory 130A is used to generate the checkpoint, and as long as the second disk operation completes before the second data block of the base disk file is used to generate the checkpoint, then the completion of the first and second disk operations will be correctly incorporated into the checkpoint. If a COW fault does not occur relative to either the first memory page of the VM memory 130A or the second data block of the base disk file 140A, then the pending disk operations will also be correctly incorporated into the state of the continuing VM once the disk operations complete, as the state of the continuing VM still includes both the first memory page and the second data block.

When implementing the invention in a system that includes an IO-MMU, a person of skill in the art will understand how to use the IO-MMU to advantage in implementing the invention. For example, the IO-MMU may be configured to, in effect, trigger a COW memory fault for new disk read operations that are issued after a checkpoint generation is initiated. In this case, a step 816 of FIG. 3A, which is described below, would not be required.

If a COW fault occurs relative to the first memory page of the VM memory 130A before the first memory page is saved to disk for the checkpoint, then a copy of the first memory page is generated for use by the continuing VM. Now if the COW fault occurs before the completion of the first pending disk operation, then the first data block from the base disk file 140A is written into the first memory page of the VM memory 130A, which will be used for checkpointing, and not into the copy of the first memory page caused by the COW fault, which will be used by the continuing VM. Thus, if the COW fault occurs before the pending disk operation completes, the continuing VM will not see the results of the pending disk operation. This situation can generally be resolved by issuing a third disk operation in which the first data block of the base disk file is also read into the copy (created in response to the COW fault) of the first memory page of the VM memory. This approach is implemented in this invention, as described in greater detail below relative to a step 815 of FIG. 3A.

Figure 3D:
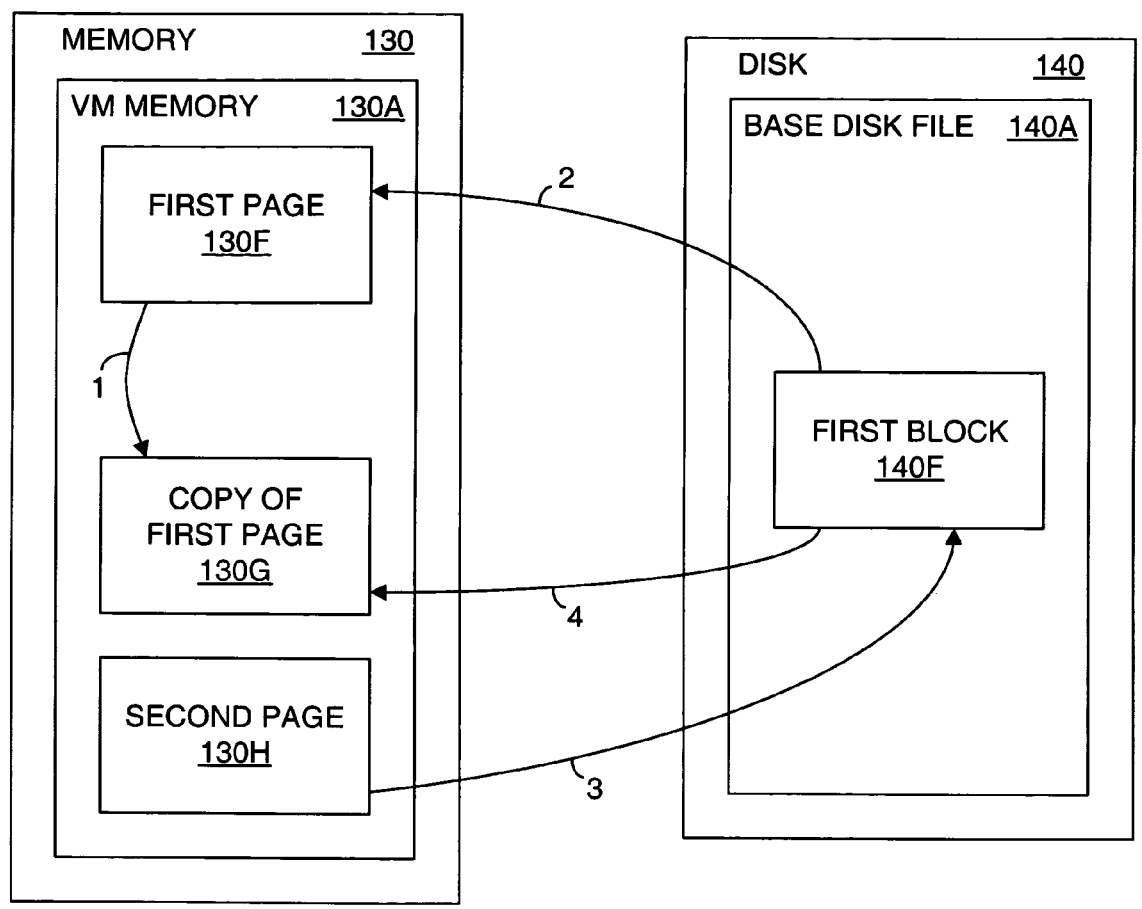
FIG. 3D illustrates a disk write interposed between a pair of disk reads, all involving a first data block.

Now suppose a slightly different situation occurs, as illustrated in FIG. 3D. FIG. 3D shows the memory 130, including the VM memory 130A, which further includes a first physical memory page 130F, a copy of the first memory page 130G and a second physical memory page 130H. FIG. 3D also shows the disk 140, including the base disk file 140A, which further includes a first data block 140F.

Now suppose that there is a pending disk read from the first data block 140F into the first memory page 130F and a pending disk write from the second memory page 130H into the first data block 140F, when a checkpoint generation is initiated. Suppose further that, before the pending disk read completes, a memory write is performed to the first memory page 130F, giving rise to a COW fault, so that the copy of the first memory page 130G is created, as shown by a reference number 1 in FIG. 3D. Suppose that the pending disk read completes next, as shown by a reference number 2 in FIG. 3D. The pending disk read writes the data from the first data block 140F into the first memory page 130F, and not into the copy of the first memory page 130G. Now, in an attempt to ensure that the continuing VM sees the results of the pending disk read operation, a second disk read is issued to write the data from the first data block 140F into the copy of the first memory page 130G. However, suppose that the pending disk write completes next, as shown by a reference number 3 in FIG. 3D. The disk write from the second memory page 130H to the first disk block 140F modifies the contents of the first data block 140F. Next, the disk read from the first disk block 140F to the copy of the first memory page 130G completes, as shown by a reference number 4 in FIG. 3D. The modified contents of the first data block 140F are written into the copy of the first memory page 130G, instead of the original contents. Thus, the continuing VM will not see the correct contents in the copy of the first memory page 130G.

This potential problem is resolved in the preferred embodiment in the step 812. At the step 812, the checkpoint software 342 checks all pending disk operations to see if there is a pending disk read of a data block, followed by a pending disk write to the same data block. If this situation exists, the method of FIG. 3A is delayed until all pending disk operations complete. This way, there will be no COW faults before the disk operations complete, and all of the pending disk operations will be correctly incorporated into both the checkpointed state and the state of the continuing VM.

Other resolutions for this situation are also possible. For example, the checkpoint software 342 could wait for a COW fault to occur on a memory page of the VM memory 130A. In response to such a COW fault, the checkpoint software 342 could determine if there is a pending disk read into the same memory page. If there is no such pending disk read, the response to the COW fault may proceed in a normal manner. On the other hand, if there is a pending disk read to the memory page at which the COW fault occurred, then the continuing VM may be suspended until the disk read completes. Once the disk read completes, the response to the COW fault may proceed in a normal manner. The copy of the memory page created by the COW fault will contain the data from the disk read, ensuring that the results of the disk read are correctly incorporated into the state of the continuing VM. However, in a typical virtual computer system, having a pending disk read into the same memory page on which a COW fault has occurred is much more likely to occur than having a pending disk read of a block followed by a pending disk write to the same block. Thus, if we consider a VM operating over a significant period of time and generating a significant number of checkpoints, the first solution described above will generally have a much smaller impact on the operation of the continuing VM than the second solution.

On a related topic, if the VM 200 is connected to a network, such as through the network interface 180, there may also be pending network operations, or network packets that were issued to the actual hardware prior to the initiation of the checkpoint, but which have not yet been sent, or network packets that have been received by the hardware, but not yet reported to software. Such pending network operations are preferably handled differently from pending disk operations. The guest OS 220 and/or the guest applications 260 may have adverse reactions to the failure of a disk operation to complete. However, computer systems are generally designed to be quite tolerant of failed network operations. Thus, the approach taken in the preferred embodiment of the invention is to simply indicate that all pending network operations have completed, for both the continuing VM and any VM that is resumed at a later time from the checkpointed state. If either the continuing VM or a resumed VM detects that a data packet was not received by an intended recipient, then the VM will simply resend the data packet. Similarly, if another system detects that a data packet that it sent to the virtual computer system 700 was not received by either the continuing VM or a resumed VM, then the other system must resend the data packet.

Returning to the method of FIG. 3A, after the step 812, the method proceeds to a step 814. FIG. 2D illustrates changes to the state of the virtual computer system 700 from the step 814 through a step 824 of FIG. 3A. First, at the step 814, the execution of the VM 200 is resumed, as shown in parentheses, using bolded text, within the box of the VM 200 of FIG. 2D. At this point, the VM 200 is again allowed to execute, along with the checkpoint software 342, like any two processes in a standard multitasking operating system. The relative priorities of the VM 200 and the checkpoint software 342 may vary depending on the relative importance of minimizing the interference with the ongoing operation of the VM 200 caused by the checkpoint generation and the speed at which the checkpoints must be generated or are preferred to be generated.

After the step 814, the method of FIG. 3A proceeds to the step 815. If the checkpoint software 342 delayed at the step 812 to wait for all pending disk operations to complete, then the checkpoint software passes straight through the step 815. If there was no delay at the step 812, then the step 815 is performed on an ongoing basis during the generation of the checkpoint. At the step 815, the checkpoint software effectively reissues certain of the pending disk reads, but with the data that is read from the disk being directed to memory pages of the continuing VM. As described above, if a COW fault occurs on a memory page of the VM memory 130A into which a pending disk read is to transfer data, the data will be transferred into the original memory page, instead of the copy of the original memory page. The continuing VM will not see the effects of this pending disk read. Therefore, at the step 815, unless there was a delay at the step 812, as each pending disk read completes that transferred data into a memory page for which a COW fault has occurred, the disk read is reissued, but with the data being transferred this time from the original disk block into the copy of the original memory page. Also, the continuing VM is not notified of the completion of the original disk read that transferred data into the original page, but the continuing VM is notified of the completion of the reissued disk read.

Next, the step 816 shows another step that is performed on an ongoing basis during the generation of the checkpoint. For this step, the checkpoint software 342 responds to any new disk reads generated by the VM 200. To perform the step 816, a portion of the checkpoint software 342 may be implemented within the disk emulator 330A. As described above, disk reads are typically DMA operations, which are not subject to the virtual memory system implemented by the MMM 350, including the COW provisions. Suppose for example, the VM 200 issues a disk read into a first memory page of the VM memory 130A. Suppose further that no COW fault has occurred relative to this memory page, so that it is still marked COW, and there is no copy of the memory page. The disk read operation would write data into the first memory page without triggering the COW provisions. But this first memory page is still the original copy of the memory page, which should not be modified until it is used for the checkpoint generation. The disk read, if allowed to complete normally, would change the checkpointed state from the state at which the checkpoint was initiated. To remedy this situation, the checkpoint software 342 forces a COW fault on the first memory page before allowing the disk read to issue. In response to the COW fault, a copy of the memory page is created and the address mapping for the corresponding GVPN is changed to the PPN of the copied memory page, as described above relative to FIGS. 3B and 3C. The disk read is now issued to read the data into the copy of the first memory page, instead of reading the data into the first memory page itself.

Figure 3E:
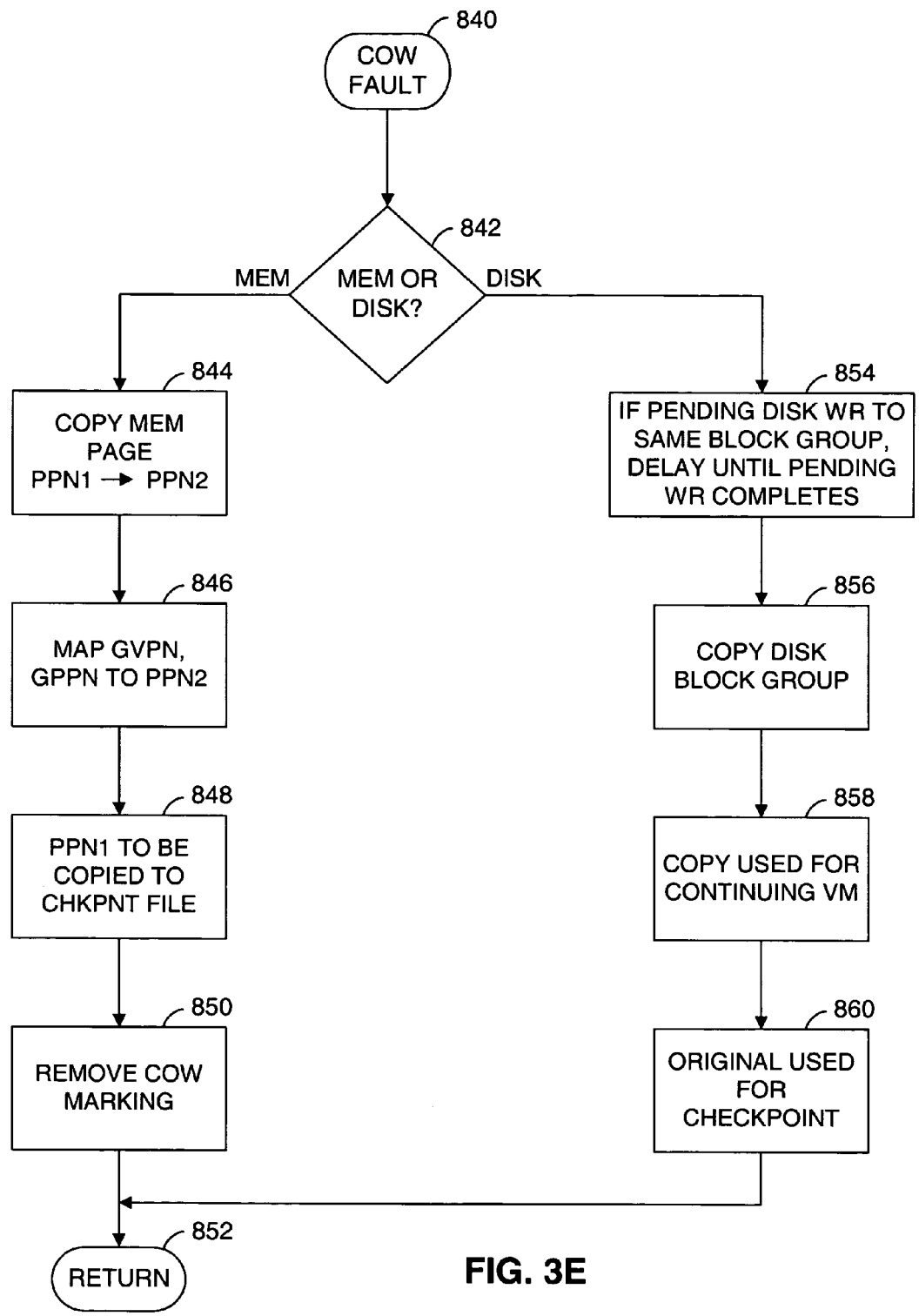
FIG. 3E illustrates a method that is used in the first embodiment of the invention to handle an attempted write to a copy-on-write page in memory or a copy-on-write block of a disk during the generation of a checkpoint.

The next step of the method, step 818, also represents an ongoing step. As the checkpoint is being generated, the checkpoint software 342 responds to any COW faults related either to the VM memory 130A or the COW disk file 140B. A method for responding to these COW faults is illustrated in FIG. 3E. The method begins at a step 840. Next, at a step 842, the checkpoint software determines whether the COW fault relates to the VM memory 130A or to the COW disk file 140B. If the fault resulted from an attempted write to the VM memory 130A, the method proceeds to a step 844. The portion of the method from the step 844 to a step 850 was described above in connection with FIGS. 3B and 3C. At the step 844, the checkpoint software copies a first memory page (PPN1), the page for which the COW fault occurred, into a second memory page (PPN2). Next, at a step 846, the checkpoint software changes the mapping for the GVPN and the GPPN that have been mapped to the first memory page, PPN1, over to the second memory page, PPN2, so that the second memory page, PPN2, will be used by the VM 200 for any subsequent memory operations. As indicated at a step 848, the first memory page, PPN1 will be copied to a checkpoint file as part of the checkpointed state. Next, at the step 850, the COW marking is removed from the first memory page, PPN1.

FIG. 2D shows three different types of memory pages that may exist within the VM memory 130A. For memory pages for which a COW fault has not yet occurred, the unmodified, original memory pages are shown as "Original, uncopied" memory pages 130I. FIG. 2D shows that these memory pages are marked COW. When a COW fault occurs on an unmodified, original memory page, the original memory page is copied, resulting in a still unmodified, original memory page and a copy of the original memory page. The unmodified, original memory pages for which a COW fault has occurred are shown as "Original, copied" memory pages 130J. FIG. 2D shows that these memory pages are no longer marked COW. The copies of the original memory pages 130J are shown as "copies" 130K. Thus, before the above example, the first memory page PPN1 would be an original, uncopied memory page 130I, while after the above example, the first memory page PPN1 would be an original, copied memory page 130J and the second memory page PPN2 would be a copy 130K.

In the case of a COW fault resulting from an attempted write to the COW disk file 140B, the method of FIG. 3E proceeds from the step 842 to a step 854. Now a distinction should be drawn between the size of a data block of the physical disk 140 and the size of the granularity used in implementing the COW disk functions. The size of a data block for a physical disk is generally defined as the smallest set of data that may be written to the disk in a single write operation. In this case, the granularity for COW disk functions cannot be smaller than the data block size. Thus, the size of the granularity for COW disk functions is typically greater than or equal to the size of a data block and is typically an integer multiple of the size of a data block. Also, of course, boundaries used for COW disk functions are also generally aligned on data block boundaries. Thus, for example, suppose that the physical disk 140 has a data block size of 512 bytes and the COW disk functions are implemented with a granularity of 2048 bytes, so that the COW disk functions operate on groups of four data blocks. Such a group of data blocks on which the COW disk functions operate will be referred to as a COW block group.

Now suppose the VM has attempted a write to a data block for which the COW disk file contains a pointer to a first data block in the base disk file 140A. At the step 854, the checkpoint software 342 checks to see if there is also a pending disk write to the COW block group containing the first data block, from before the checkpoint generation was initiated, which has not yet completed. If there is such a pending disk write, then the pending response to the COW fault and the new disk write are delayed until the pending disk write completes to the COW block group. This ensures that the data of the pending disk write will be seen by the continuing VM once the copy of the COW block group is made. Having a new disk write to the same COW block group as a pending disk write is not likely to occur often, especially if the size of the granularity for the COW disk is small. In fact, if the size of the granularity for the COW disk is the same size as the size of a data block, then the step 854 is unnecessary. During the delay that may be imposed by this step 854, the execution of the VM 200 and/or the generation of the checkpoint by the checkpoint software may generally proceed.

After the step 854, the method of FIG. 3E proceeds to a step 856. At this step, the COW block group of the base disk file containing the first disk block is copied to the corresponding disk blocks of the COW disk file, in place of the pointer to the first disk block. Next, a step 858 indicates that the copy in the COW disk file is used by the VM 200. Next, a step 860 indicates that the first disk block of the base disk file is used for the generation of the checkpoint. Instead of implementing the steps 856 to 860 within the virtual computer system 700, the disk COW functions may alternatively be provided by an external data storage system, for example, such as in the case of the snapshot operation mentioned above, which is provided by many SAN systems and NAS systems. Otherwise, if the step 854 were not included in this method, the COW block group of the base disk file containing the first disk block may be copied before the pending disk write completes. The pending disk write would be addressed to the COW block group of the base disk file, and not to the copy of the COW block group in the COW disk file. As a result, the checkpointed state would see the result of the pending disk write in the base disk file, but the continuing VM would not see the result of the pending disk write in the COW disk file. The step 854 delays the copying of the COW block group until after the pending disk write completes to ensure that both the checkpointed state and the continuing VM see the result of the pending disk write.

Returning to the description of FIG. 3A, after the step 818, the method proceeds to a step 820. At this step, the checkpoint software 342 creates a checkpoint file 142 on the physical disk 140. The checkpoint software then copies the device state 130C from the VMM memory 130B into the checkpoint file 142 to create a copy of the device state 142B. The actions taken during the step 820 are also highlighted in FIG. 2D with thick lines and bolded text.

In other embodiments, the checkpoint file 142 may be stored in any of various other forms of data storage, such as in RAM on the virtual computer system 700, in RAM on a remote device or system, in nonvolatile flash memory, or in a tape storage system. For example, the checkpoint file 142 may be stored in RAM to provide the capability of resuming execution of a VM from the checkpointed state very quickly. Also, the data that is stored in the checkpoint file 142 may alternatively be stored as raw data to a partition or LUN (logical unit number) of a local disk or a remote storage system, separate from any filesystem. Also, the data of the checkpoint file 142, or the raw data in alternative embodiments, may also be compressed and/or encrypted.

As described above, the relative priorities of the VM 200 and the checkpoint software 342 may vary depending on the relative importance of executing the VM 200 with minimal interference and generating the checkpoint in a timely manner. The relative priorities may also be modified, based on various criteria. For example, the priority of the VM 200 may initially be set high relative to the priority of the checkpoint software. With these priorities, if the VM 200 is relatively active, the checkpoint software may not get enough execution cycles to copy the device state 130C to the checkpoint file 142, or otherwise complete the checkpoint. Then, if the time that has elapsed since the checkpoint was initiated surpasses one or more preset time thresholds, the priority of the checkpoint software may be increased relative to the VM 200, causing the checkpointing process to progress more quickly. In this manner, the interference with the operation of the VM 200 is minimized as much as possible, while ensuring that the checkpoint is completed in a timely manner.

Various other factors may also affect overall system performance. For example, having too many memory COW faults may consume excessive amounts of memory in the copies 130K of the VM memory pages, which could cause the system to run out of memory required for other purposes, or it may cause the system to excessively swap virtual memory pages between memory and the physical disk in the known "disk thrashing" situation. Such situations may be avoided or mitigated by monitoring the quantity of memory COW faults that occur and slowing down the execution of the VM 200 to limit the number of memory COW faults. For example, the execution cycles given to the VM 200 may be cut back once the number of memory COW faults occurring in every second of execution of the VM 200 reaches some threshold value.

Next, the method of FIG. 3A proceeds to a step 822. At this step, the checkpoint software 342 waits until all pending disk reads complete, if they have not already completed, before proceeding to the next step. Other software processes, including the continuing VM, may continue executing while the checkpoint software is waiting for the pending disk reads to complete. Next, the method proceeds to the step 824. At this step, the checkpoint software copies the unmodified pages of the VM memory 130A to the checkpoint file 142, to create a copy of the VM memory 142C. For memory pages for which a COW fault has occurred, the checkpoint software copies the original memory pages to the checkpoint file, not the copied pages. After such a memory page has been copied, the page may be freed for use for some other purpose. For memory pages for which a COW fault has not occurred, the checkpoint software copies the original pages to the checkpoint file. The step of copying the VM memory 130A to the checkpoint file 142 is also highlighted in FIG. 2D using thick lines and bolded text. The possible delay imposed at the step 822 is implemented to ensure that the results of all pending disk reads are incorporated into the original memory pages of the VM memory 130A before the memory pages are captured in the checkpointed state in the VM memory copy 142C.

Next, the method of FIG. 3A proceeds to a step 828. FIG. 2E illustrates changes to the state of the virtual computer system 700 from the step 828 through a step 832 of FIG. 3A. First, at the step 828, any COW markings remaining on the memory pages of the VM memory 130A are removed, as indicated in parentheses, using bolded text, within the box of the VM memory 130A of FIG. 2E. Next, the method of FIG. 3A proceeds to an optional step 830. If the optional step 830 is performed, along with a second optional step 834, then a first implementation of the first embodiment of the invention is realized. If neither of the optional steps 830 and 834 is performed, then a second implementation of the first embodiment is realized. The steps 830 and 834 are indicated with dashed lines to indicate that they are optional. At the step 830, the checkpoint software 342 waits for any pending disk writes to complete, if they have not already completed. Next, the checkpoint software copies the base disk file 140A to a new checkpoint disk file 140C, as indicated in thick lines and bolded text in the FIG. 2E. This copy of the base disk file may be made, for example, using a hardware mirroring or copying function that is available from many data storage systems, such as a disk-to-disk copy function or a disk array to disk array copy function. This step is performed in a manner that is similar to the step 824 described above for saving the VM memory 130A to the checkpoint file 142. The possible delay before copying the base disk file is implemented to ensure that the results of any pending disk writes are incorporated into the base disk file 140A, before the base disk file is copied into the checkpoint disk file 140C, to ensure that the results of the pending disk writes are incorporated into the checkpointed state.

Next, at a step 832, the checkpoint software 342 adds a disk file pointer 142A to the checkpoint file 142 pointing to the checkpoint disk file 140C, as highlighted in FIG. 2E using thick lines and bolded text. The disk file pointer is added to the checkpoint file so that the entire checkpointed state may be determined by reference to the checkpoint file. The contents of the checkpoint file 142 and whatever file is pointed to by the disk file pointer 142A together constitute the entire checkpointed state. In this case, the checkpointed state consists of the checkpoint file 142 and the checkpoint disk file 140C.

Figure 3F:
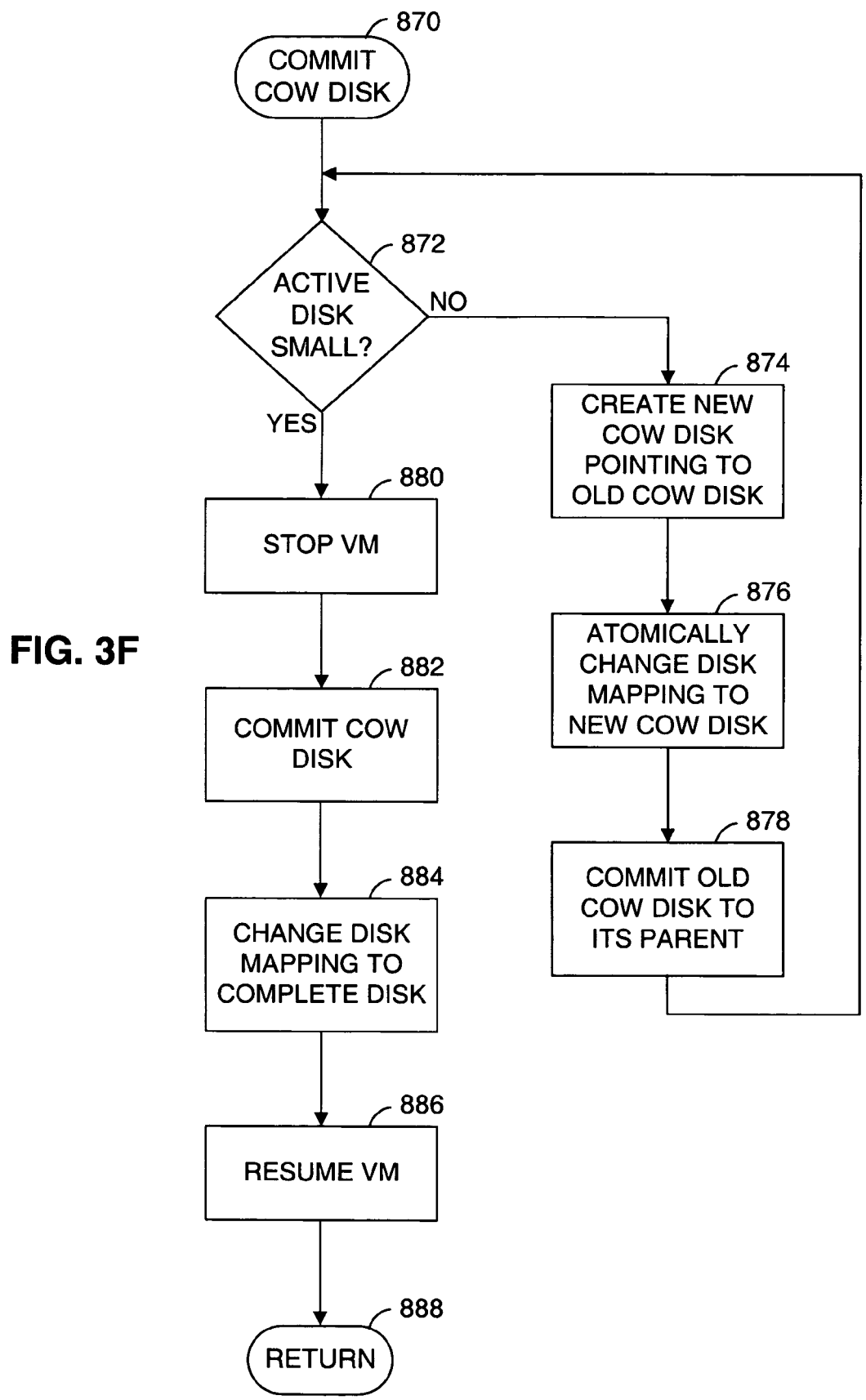
FIG. 3F illustrates a method that is used in the first embodiment of the invention to commit a copy-on-write disk file to its parent disk file during the generation of a checkpoint.

Next, the method of FIG. 3A proceeds to a step 834. FIG. 2F illustrates changes to the state of the virtual computer system 700 during the step 834 of FIG. 3A. At the step 834, the COW disk file 140B is committed into the base disk file 140A. This step is performed according to a method illustrated in FIG. 3F. The method of FIG. 3F begins at an initial step 870. Next, the checkpoint software 342 determines whether the COW disk file 140B is small enough to be immediately committed. As described in greater detail below, the VM 200 is stopped while the COW disk file is ultimately committed into the base disk file 140A. If the COW disk file 140B is too large, then the operation of the VM 200 is interrupted for too long a period while the COW disk file is committed. Thus, a threshold value for the size of the COW disk file may be established based on system performance requirements. If the COW disk file is smaller than the threshold value, then the method proceeds to a step 880; otherwise, the method proceeds to a step 874.

At the step 874, the checkpoint software 342 creates a second COW disk file that references the original COW disk file 140B. Next, at a step 876, the checkpoint software atomically changes the mapping of the disk emulator 330A, so that the virtual disk 240 is mapped to the second COW disk file, instead of to the original COW disk file. Next, at a step 878, the original COW disk file 140B is committed to its parent, the base disk file 140A. The second COW disk file is created for use by the VM 200, so that the original COW disk file can be committed to the base disk file without having to stop the execution of the VM. After the step 878, the method of FIG. 3F returns to the step 872, so that the steps 872, 874, 876 and 878 form a loop, which may be executed multiple times. After executing the loop a first time, the original COW disk file 140B has been committed to the base disk file 140A. Now the second COW disk file references the base disk file 140A. The second COW disk file should be smaller than the original COW disk file was because it has only been operating for the amount of time necessary for the checkpoint software to commit the original COW disk file. Now, at the step 872, the checkpoint software determines whether the second COW disk file is small enough to be directly committed. If not, then the loop may be performed again, with the creation of a third COW disk file referencing the second COW disk file, so that the second COW disk file may be committed to the base disk file. This loop may be performed as many times as necessary, until, at some point, the newest COW disk file will be small enough to directly commit to the base disk file 140A. At this point, the method of FIG. 3F proceeds to a step 880.

At the step 880, the checkpoint software 342 stops the execution of the VM 200. Next, at a step 882, the checkpoint software commits the current COW disk file into the base disk file 140A. Next, at a step 884, the checkpoint software changes the mapping of the disk emulator 330A, so that the virtual disk 240 is mapped to the base disk file 140A, instead of to the current COW disk file, which may be the original COW disk file 140B, or it may be one of the subsequent COW disk files created during the step 874. The committing of the COW disk file 140B and the changing of the disk mapping to the base disk file 140A are highlighted in FIG. 2F using thick lines. After the step 884, the method of FIG. 3F proceeds to a step 886. At the step 886, the execution of the VM 200 resumes. Next, the method of FIG. 3F ends at a step 888.

Returning to the description of FIG. 3A, after the step 834, the method proceeds to a step 836. At the step 836, the process of generating the checkpoint is completed, and the VM 200 continues normal operation, without any checkpointing activity. FIG. 2G illustrates the state of the virtual computer system 700 at the step 836 of FIG. 3A. The virtual computer system 700 is generally in the same state as it was in the FIG. 2A, before the initiation of the checkpoint, except that the system now includes a checkpointed state. The complete checkpointed state may be determined by reference to the checkpoint file 142. The checkpoint file 142 contains the device state copy 142B and the VM memory copy 142C. The checkpoint file 142 also contains the disk file pointer 142A, which points to the checkpoint disk file 140C. Thus, the checkpoint disk file 140C also constitutes a part of the checkpointed state.

The above description of the method of FIG. 3A focused on the first implementation, in which the optional steps 830 and 834 are performed. As described above, if the optional steps 830 and 834 are not performed, the second implementation is realized. If the step 830 is not performed, then, after the step 828, the method of FIG. 3A proceeds to the step 832. After the step 832, if the step 834 is not performed, then the method proceeds to the step 836. FIG. 2H illustrates changes to the state of the virtual computer system 700 during the steps 828 and 832 of FIG. 3A, along with the state of the virtual computer system at the step 836, if the optional steps 830 and 834 are not performed. At the step 828, any remaining COW markings are removed from the VM memory 130A, as described above, and as highlighted in bolded text in FIG. 2H. At the step 832, the disk file pointer 142A is added to the checkpoint file 142 as described above. However, in this case, the pointer points to the base disk file 140A instead of the checkpoint disk file 140C. The addition of the disk file pointer 142A pointing to the base disk file 140A is highlighted in FIG. 2H using thick lines and bolded text. FIG. 2H also illustrates the state of the virtual computer system at the step 836, after the checkpoint generation has completed. The complete checkpoint state includes the checkpoint file 142, including the device state copy 142B and the VM memory copy 142C, along with the base disk file 140A. The virtual computer system continues operating with the VM 200 using the COW disk file 140B. The COW disk file 140B may now be considered a perpetual COW disk.

Selecting between the first implementation and the second implementation involves a tradeoff. Using the perpetual COW disk in the second implementation avoids having to copy the base disk file 140A, which may take a long period of time because the base disk file may be very large. On the other hand, operating the continuing VM with the perpetual COW disk will cause some inefficiency in executing the continuing VM.

Figure 3G:
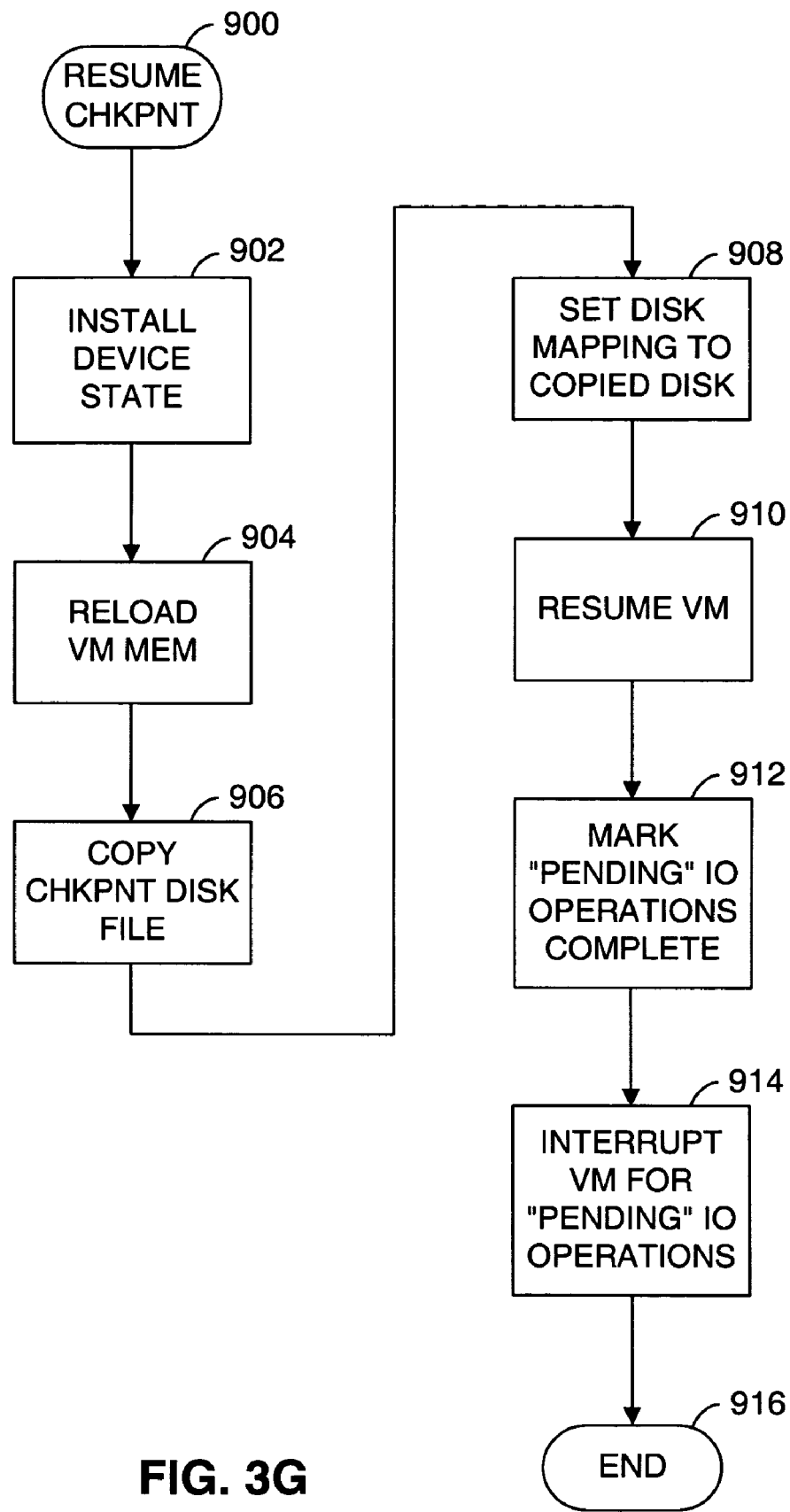
FIG. 3G illustrates a method that is used in the first embodiment of the invention to begin executing a virtual machine from a previously generated checkpoint.

As described above, after the checkpoint has been completely generated, either as illustrated in FIG. 2G or in FIG. 2H, the same VM 200 or a different VM may be caused to begin executing from the checkpointed state. A method according to the invention for starting a VM from a checkpointed state is illustrated in FIG. 3G. The method of FIG. 3G may be also performed by the checkpoint software 342. The following description assumes that the method of FIG. 3G is performed to cause the VM 200 to revert back to the checkpointed state. The following description further assumes that the VM 200 is stopped prior to the performance of the method.

The method of FIG. 3G begins at an initial step 900. At a step 902, the checkpoint software 342 installs the device state copy 142B from the checkpoint file 142. This step is basically the converse of the step 808 of FIG. 3A, except that the device state is restored from the disk 140, instead of from the VMM memory 130B. All of the virtualized registers, data structures, etc. that were previously saved from the execution state of the VM 200 are now restored to the same values they contained at the point that the checkpoint generation was initiated.

Next, at a step 904, the checkpoint software 342 restores the VM memory copy 142C from the checkpoint file 142 into the VM memory 130A. This step is basically the converse of the step 824 of FIG. 3A. Next, at a step 906, the checkpoint software makes a copy of the disk file to which the disk file pointer 142A of the checkpoint file 142 is pointing. In the case of FIG. 2G, a copy is made of the checkpoint disk file 140C, while, in the case of FIG. 2H, a copy is made of the base disk file 140A. A copy of the respective file is made at the step 906 to enable the same checkpoint to be used again at a later time. Alternatively, in the case of FIG. 2H, a copy of the base disk file 140A may be made to enable the continuing VM 200 to continue executing using the COW disk file 140B, which references the base disk file 140A. If there is no desire to use the checkpoint again later and, for the case of FIG. 2H, if there is no desire to continue executing the VM 200, then the step 906 may be skipped. Next, at a step 908, the configuration of the disk emulator 330A is modified so that the virtual disk 240 is mapped to the disk file copy that was created during the step 906. As another alternative for enabling a checkpoint to be used multiple times or for enabling the continuing VM 200 to continue executing in the case of FIG. 2H, a new COW disk file may be created referencing the disk file to which the disk file pointer 142A is pointing, and the virtual disk 240 may be mapped to the new COW disk file. This alternative using a new COW disk file may be preferred in many situations because the checkpoint disk file may take a long time to copy.

Next, at a step 910, the execution of the VM 200 is resumed. At this point, the VM 200 will have substantially the same device state as it had when the checkpoint generation was initiated, the VM memory 130A will be in the same state, and the disk file used by the VM 200 will also be in the same state. In the preferred embodiment, the VM 200 will begin executing again in substantially the same manner as if the VM 200 had been halted at the time the checkpoint generation was initiated, and is just now getting restarted.

Next, at a step 912, all pending input/output (IO) operations, including pending disk operations and pending network operations, are marked as having completed. As described above, the results of all pending disk reads were incorporated into the VM memory 130A and the results of all pending disk writes were incorporated into the base disk file 140A, before the VM memory and the base disk file were used to generate the checkpoint, so that the results of all pending disk reads will be seen by the VM 200 when it resumes execution from the checkpointed state. Also as described above, the pending network operations are ignored, and it is up to the respective network software packages to detect any network packets that must be resent. Next, at a step 914, the VM 200 is interrupted, as appropriate, for any pending IO operations, as if they have just completed. Thus, in particular, a pending disk operation is marked as having completed in the step 912, and then the VM 200 is interrupted to notify the VM that the disk operation has completed. Next, the method of FIG. 3G ends at a step 916. From this point, the VM 200 will continue executing from the checkpointed state.

Returning to the techniques of this invention used for generating checkpoints, the method of FIG. 3A, with the optional steps 830 and 834, may be adapted in a variety of ways to generate additional checkpoints. FIGS. 4A through 4D illustrate how multiple checkpoints may be generated without having to copy any disk files. Depending on the particular implementation, disk files may be quite large and may require substantial periods of time to copy. The virtual computer system 700 may not have sufficient idle processing time to copy such a large disk file, without interfering with the operation of the VM 200, or other VMs or applications within the virtual computer system.

Figure 4A:
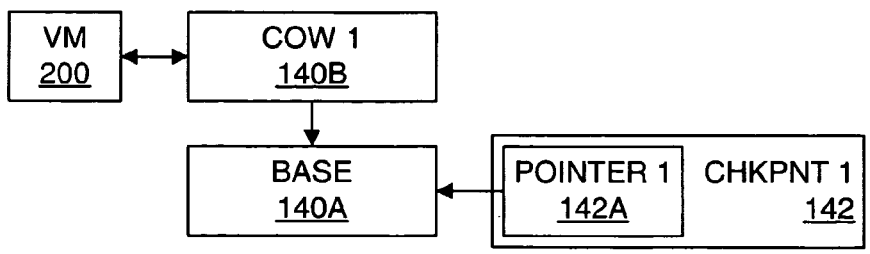
FIG. 4A illustrates a subset of the main components of the first embodiment in the same configuration as illustrated in FIG. 2H.

FIG. 4A is a simplified version of FIG. 2H, representing the state of the virtual computer system 700 after the generation of a first checkpoint using the second implementation of the first embodiment. FIG. 4A shows the VM 200, the base disk file 140A, the first COW disk file 140B, and the first checkpoint file 142, including the first disk file pointer 142A. As represented in FIG. 4A, the VM 200 is using the first COW disk file 140B as a perpetual COW disk file. The COW disk file 140B references the base disk file 140A. The first disk file pointer 142A indicates that the base disk file 140A constitutes a part of the first checkpoint file 142, along with the contents of the first checkpoint file 142.

Figure 4B:
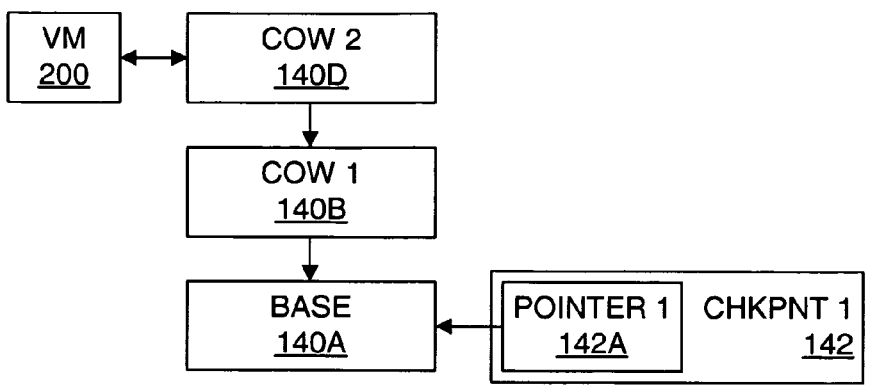
FIG. 4B illustrates the subset of the main components of the first embodiment during the generation of a second checkpoint according to the second implementation.

Now suppose that a second checkpoint generation is initiated. The checkpoint software 342 will again perform the method of FIG. 3A, or a slightly modified form of the method of FIG. 3A, to generate a second checkpoint. FIG. 4B illustrates the state of the virtual computer system 700 during the generation of the second checkpoint. At the step 802, the checkpoint software generates a second COW disk file 140D, which references the first COW disk file 140B. At the step 810, the disk emulator 330A is configured so that the virtual disk 240 is mapped to the second COW disk file 140D, instead of to the first COW disk file 140B. As shown in FIG. 4B, at this point, the VM 200 is using the second COW disk file 140D, which references the first COW disk file 140B, which further references the base disk file 140A. The first disk file pointer 142A still points to the base disk file 140A.

Figure 4C:
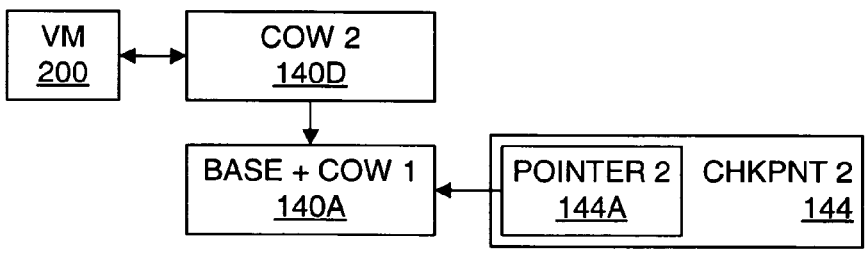
FIG. 4C illustrates the subset of the main components of the first embodiment after the completion of the second checkpoint according to the second implementation, with the first checkpoint being overwritten.
Figure 4D:
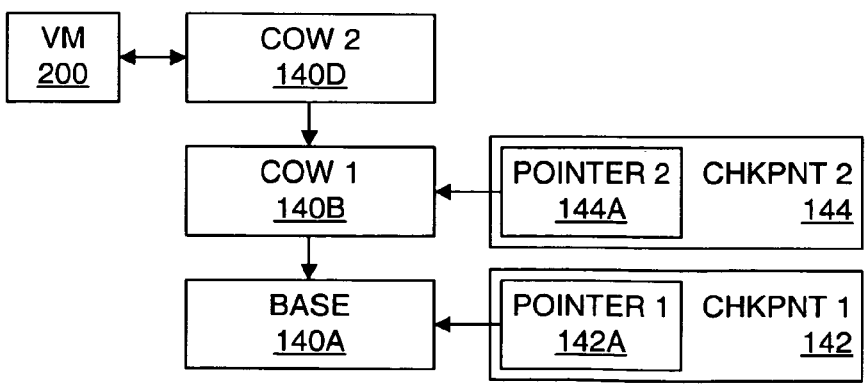
FIG. 4D illustrates the subset of the main components of the first embodiment after the completion of the second checkpoint according to the second implementation, with the first and second checkpoints being maintained.

FIGS. 4C and 4D illustrate two options for completing the generation of the second checkpoint. In FIG. 4C, the second checkpoint effectively overwrites the first checkpoint, so that the first checkpoint is eliminated. In FIG. 4D, the second checkpoint is saved independently of the first, so that the first checkpoint is retained. Referring first to FIG. 4C, at the step 820 of FIG. 3A, the device state 130C is saved to a second checkpoint file 144, and, at the step 824, the VM memory 130A is also saved to the second checkpoint file 144. Also, at the step 834, the first COW disk file 140B is committed to the base disk file 140A, and the second COW disk file 140D is changed to reference the base disk file 140A. At the step 832 of FIG. 3A, a second disk file pointer 144A is added to the second checkpoint file 144, pointing to the base disk file 140A. After the first COW disk file 140B is committed to the base disk file 140A, the first checkpoint file 142 is deleted because it no longer represents a valid checkpoint. The base disk file 140A to which the first disk file pointer 142A points now includes changes that occurred after the first checkpoint was taken, while the remainder of the first checkpoint file 142 does not include any changes subsequent to the first checkpoint. Thus, FIG. 4C shows a single checkpoint file, the second checkpoint file 144, which includes the device state copy and the VM memory copy of the second checkpoint, along with the disk file pointer 144A, pointing to the base disk file 140A, which now includes the changes to the disk file through the second checkpoint, which had been captured in the first COW disk file 140B. The state of the virtual computer system 700 reflected in FIG. 4C is generally the same as the state reflected in FIG. 4A, except that the second checkpoint is saved, instead of the first checkpoint. Subsequent checkpoints can be generated in the same manner, with each subsequent checkpoint overwriting the previous checkpoint.

The state of FIG. 4D can also result from the state of FIG. 4B, by applying a slightly different variation of the general method of FIG. 3A. At the step 820 of FIG. 3A, a second checkpoint file 144 is generated, and the device state 130C is saved to this second checkpoint file 144, instead of overwriting the device state copy 142B of the first checkpoint file 142. Also, at the step 824 of FIG. 3A, the VM memory 130A is saved to the second checkpoint file 144, instead of overwriting the VM memory copy 142C of the first checkpoint file 142. At the step 832 of FIG. 3A, a second disk file pointer 144A is added to the second checkpoint file 144, pointing to the first COW disk file 140B. In this situation, the optional step 834 of FIG. 3A is not performed, and both the first COW disk file 140B and the second COW disk file 140D are retained. At the end of the generation of the second checkpoint, as illustrated in FIG. 4D, the VM 200 is using the second COW disk file 140D. The second COW disk file 140D references the first COW disk file 140B, and the first COW disk file 140B references the base disk file 140A. Both the first and second checkpoints are valid, so that the VM 200, or another VM, can be caused to begin executing from either of these checkpointed states. The first checkpointed state comprises the contents of the first checkpoint file 142, and the base disk file 140A, as indicated by the first disk file pointer 142A. The second checkpointed state comprises the contents of the second checkpoint file 144, and the first COW disk file 140B, as indicated by the second disk file pointer 144A.

Subsequent checkpoints can also be generated in the same manner, with an additional COW disk file being generated for use by the VM 200 each time, and with a new checkpoint file being created each time. One advantageous use of this invention is to generate checkpoints at regular time intervals, so that, if necessary or desirable, the VM may be rolled back to a relatively recent checkpointed state. Such an approach can lead to a lot of checkpoints in a relatively short period of time, though, if checkpoints are generated frequently. Any of these multiple checkpoints can be eliminated at any time, if desired. For example, the first checkpoint of FIG. 4D can be eliminated by deleting the first checkpoint file 142, committing the first COW disk file 140B into the base disk file 140A, changing the second COW disk file 140D to reference the base disk file 140A, and changing the second disk file pointer 144A to point to the base disk file 140A.

Figure 5A:
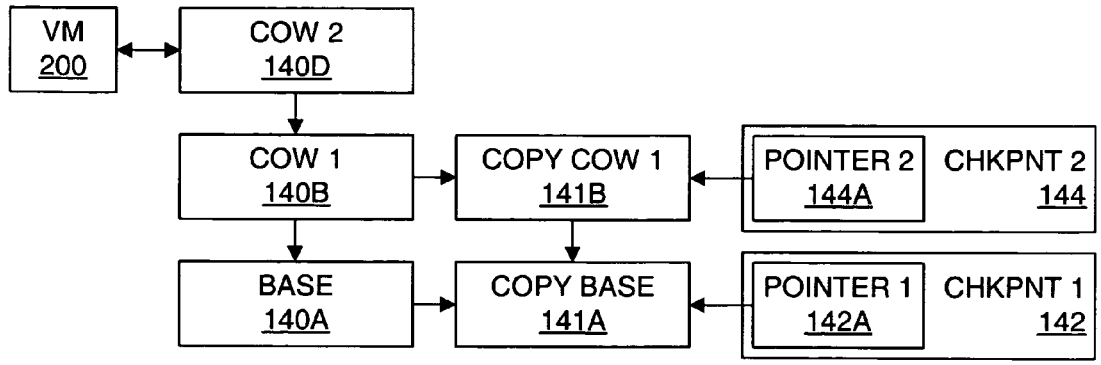
FIG. 5A illustrates the subset of the main components of the first embodiment during the generation of a second checkpoint according to a third implementation.
Figure 5B:
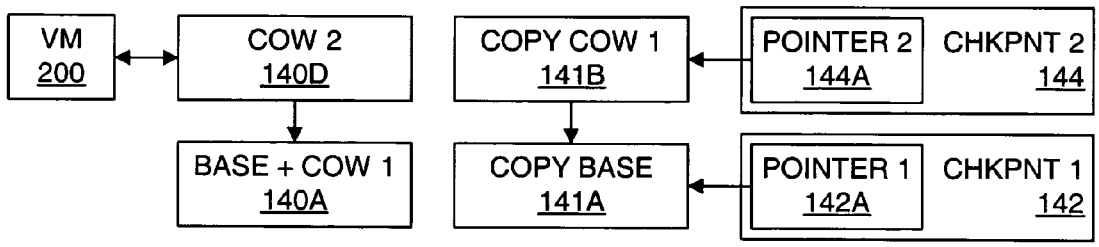
FIG. 5B illustrates the subset of the main components of the first embodiment after the completion of the second checkpoint according to the third implementation.

FIGS. 5A through 5E illustrate still other approaches for generating multiple checkpoints, and for eliminating checkpoints, as desired. The approaches depicted in FIGS. 5A through 5E may be considered a third implementation of the first embodiment of the invention. The state of FIG. 5A may be derived from the state of FIG. 4D. From the state of FIG. 4D, the base disk file 140A is copied to a base disk file copy 141A, and the first COW disk file 140B is copied to a first COW disk file copy 141B, as shown in FIG. 5A. As the first COW disk file 140B is copied over to the first COW disk file copy 141B, the copy is re-parented to reference the base disk file copy 141A, instead of the base disk file 140A. Techniques for changing the parent of a COW disk file are known in the art and depend on the particular COW implementation that is used. For example, in some implementations, a data structure related to the COW disk file contains a pointer to the parent disk file. In such a case, the COW disk file may be re-parented by simply changing the pointer to point to the new parent, instead of the old parent. Also, the first disk file pointer 142A is changed to point to the base disk file copy 141A, instead of the base disk file 140A, and the second disk file pointer 144A is changed to point to the first COW disk file copy 141B, instead of the first COW disk file 140B.

Next, the first COW disk file 140B is committed into the base disk file, 140A, and the second COW disk file 140D is changed to reference the base disk file 140A. Now, the virtual computer system 700 is in the state illustrated in FIG. 5B. The VM 200 is using the second COW disk file 140D, which references the base disk file 140A, which includes the changes that had been captured in the first COW disk file 140B. There are also two saved checkpoints. The first checkpoint comprises the contents of the first checkpoint file 142 and the contents of the base disk file copy 141A, as indicated by the first disk file pointer 142A. The second checkpoint comprises the contents of the second checkpoint file 144 and the contents of the first COW disk file copy 141B, as indicated by the second disk file pointer 144A.

Figure 5C:
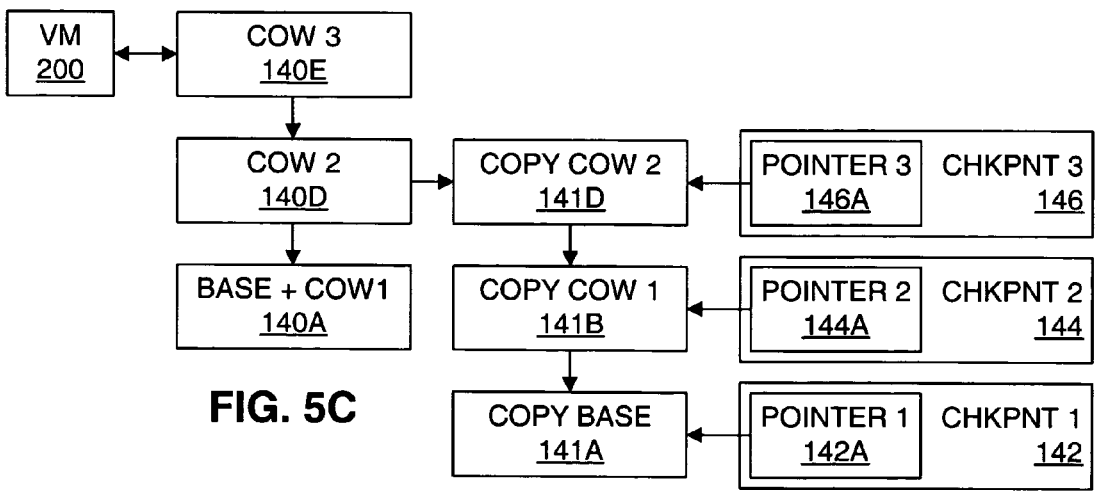
FIG. 5C illustrates the subset of the main components of the first embodiment during the generation of a third checkpoint according to the third implementation.

Next, a third checkpoint is generated, as illustrated in FIG. 5C. A third COW disk file 140E is created, which references the second COW disk file 140D, and the disk emulator 330A is configured so that the VM 200 uses the third COW disk file 140E, instead of the second COW disk file 140D. Next, the device state 130C and the VM memory 130A are saved to a new, third checkpoint file 146. Also, the second COW disk file 140D is copied into a new, second COW disk file copy 141D, and the second COW disk file copy 141D is re-parented to the first COW disk file copy 141B, instead of the base disk file 140A. Next, a new, third disk file pointer 146A is added to the third checkpoint file 146, pointing to the second COW disk file copy 141D.

Figure 5D:
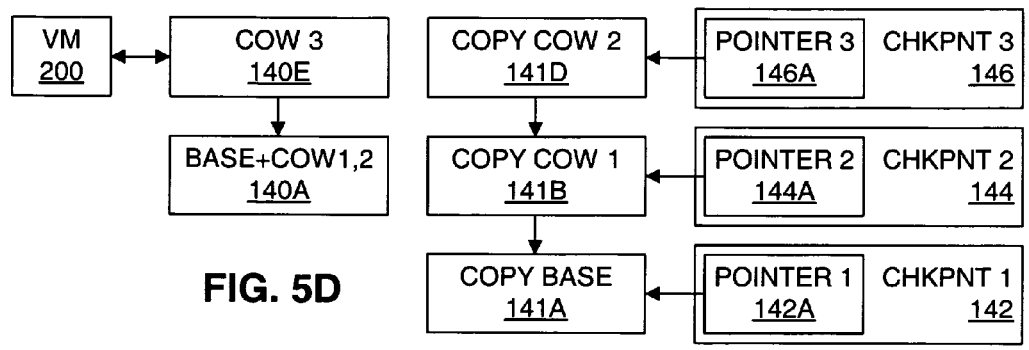
FIG. 5D illustrates the subset of the main components of the first embodiment after the completion of the third checkpoint according to the third implementation.

Next, as shown in FIG. 5D, the second COW disk file 140D is committed into the base disk file 140A, and the third COW disk file 140E is changed to reference the base disk file 140A. Now, after the generation of the third checkpoint, the VM 200 uses the third COW disk file 140E, which references the base disk file 140A. Also, all three checkpoints are retained. The first checkpoint comprises the contents of the first checkpoint file 142, along with the contents of the base disk file copy 141A, as indicated by the first disk file pointer 142A. The second checkpoint comprises the contents of the second checkpoint file 144, along with the contents of the first COW disk file copy 141B, as indicated by the second disk file pointer 144A. The third checkpoint comprises the contents of the third checkpoint file 146, along with the contents of the second COW disk file copy 141D, as indicated by the third disk file pointer 146A.

Figure 5E:
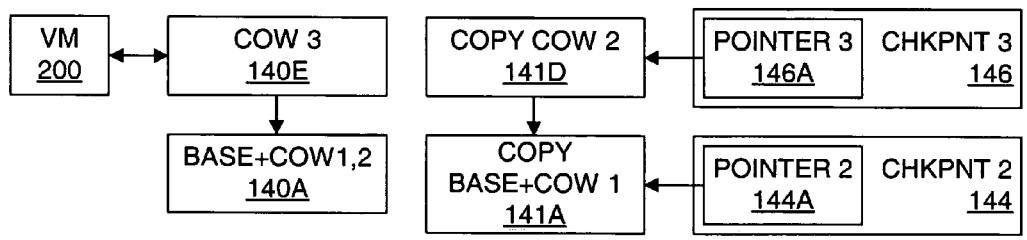
FIG. 5E illustrates the subset of the main components of the first embodiment after the completion of the third checkpoint according to the third implementation, and after the first checkpoint has been eliminated.

The third implementation of FIGS. 5A through 5E is similar to the second implementation of FIGS. 4A through 4D in that numerous checkpoints may be created, and selected checkpoints may be eliminated, as desired. For example, as shown in FIG. 5E, the first COW disk file copy 141B may be committed into the base disk file copy 141A, the second COW disk file copy 141D may be changed to reference the base disk file copy 141A, the second disk file pointer 144A may be changed to point to the base disk file copy 141A, and the first checkpoint file 142 may be deleted, to eliminate the first checkpoint. Various additional checkpoints may be generated, while any subset of the checkpoints may be eliminated, using the techniques illustrated in FIGS. 5A through 5E. Again, there is a tradeoff between the second implementation of FIGS. 4A through 4D and the third implementation of FIGS. 5A through 5E. The second implementation generally does not require that disk files be copied during the generation of checkpoints, while the third implementation limits the number of COW disk files through which the continuing VM must execute, which limits the performance degradation for the continuing VM.

The method of FIG. 3A can be used to generate one or more checkpoints for a VM that is currently running. The method of FIG. 3G can be used to cause a VM to begin executing from one of the checkpoints generated by the method of FIG. 3A. These methods may be modified in a variety of ways within the scope of this invention. In particular, pending IO operations may be handled in different manners, depending on the particular implementation. Also, a number of other steps may be taken to speed up the performance of these methods. In particular, various steps may be taken to avoid having to save pages of the VM memory 130A to the checkpoint file 142. For example, if one or more pages of memory have not changed over multiple checkpoints, redundant copies of the page(s) need not be stored. Instead, later checkpoints may include a pointer to an earlier checkpoint, in place of a duplicate memory page.

This invention may also be combined in a synergistic manner with other inventions that are owned by the assignee of this invention. One example relates to U.S. patent application Ser. No. 09/915,045 ("the '045 application"), entitled Content-Based, Transparent Sharing of Memory Pages, which is incorporated here by reference. The '045 application discloses a method by which multiple memory pages within a VM that contain the exact same content may be consolidated into a single memory page that is marked COW. For example, if multiple instances of the same application are executing in the VM, one or more pages of the application may be duplicated in memory. Also, there are often multiple memory pages that contain nothing but zeroes. When multiple copies of the same page are detected, all but one such page may be freed for other uses, and the remaining page may be marked COW and used by all the processes that need a copy of the page. If any such process attempts to write to the COW page, then that process is given its own copy of the page with read and write capabilities. Meanwhile, substantial memory resources may be conserved by eliminating the duplicated use of the other copies of the same page. The invention of the '045 application may be synergistically combined with the present invention in a couple of ways. First, the memory pages that are shared according to the invention of the '045 application are already marked COW, which saves some time during the step 806 of FIG. 3A, in which the memory pages of the VM memory 130A are marked COW. Second, the checkpoint software 342 can avoid writing duplicated memory pages to the checkpoint file 142 during the step 824, which conserves disk space on the disk 140 and reduces the time required to perform the step 824.

Another invention with which this invention may be synergistically combined is disclosed in U.S. patent application Ser. No. 09/668,666 ("the '666 application"), entitled System and Method for Controlling Resource Revocation in a Multi-Guest Computer System, which is also incorporated here by reference. The '666 application discloses a method by which memory pages are requested of the guest OS of a first VM so that the memory pages may be used in a second VM. In this situation, the memory pages are not actually used within the first VM. Thus, the unused memory pages need not be stored to the checkpoint file 142 during the step 824 of FIG. 3A.

This invention may also be extended to generate one checkpoint for each of multiple VMs, with each of the checkpoints for the multiple VMs being initiated at substantially the same time. The multiple VMs may all be executing within the same physical computer system, or they may be distributed over multiple physical computer systems. For example, suppose that three VMs are executing within a single physical computer system to provide a single web service, such as a database server with a search engine. A first VM may provide front-end functions such as handling requests from clients, while a second VM and a third VM implement back-end functions, such as each VM containing different parts of the database. The first VM may load-balance the requests from the clients between the second VM and the third VM. The checkpoint software 342 of this invention may be used to initiate a checkpoint for each of these three VMs at substantially the same time. This task may be accomplished in a variety of ways. For example, a single checkpoint software entity 342 may perform the checkpoint generation for all of the three VMs; or a separate instance of the checkpoint software 342 may be contained in each of three VMMs, with each VMM supporting a different one of the VMs, and a different instance of the checkpoint software 342 performing the checkpoint generation for each of the respective VMs.

Also, various techniques may be used to ensure that the initiation of the multiple checkpoints is adequately synchronized. For example, if multiple VMs are executing within a single multiprocessor physical computer system, with each of the multiple VMs executing on a separate processor, then separate instances of the checkpoint software 342 may coordinate the initiation of the multiple checkpoints using standard interprocessor communication techniques. Similarly, if multiple VMs are executing in a multitasking environment, separate instances of the checkpoint software 342 may communicate with each other using known interprocess communication techniques. As another alternative, multiple instances of the checkpoint software 342 may initiate the generation of a checkpoint independently of each other, but based on a common time reference. For example, each of multiple VMs may be executing on separate physical computer systems, with each of the physical computer systems connected to a computer network. Then, a separate instance of the checkpoint software 342 may initiate a checkpoint generation for each of the VMs on each of the separate physical computer systems, at a specified time, based on the known network time protocol (NTP), for example. The NTP may be used in this manner to generate synchronized checkpoints for multiple VMs on a periodic basis, for example.

Once a set of synchronized checkpoints is generated for each of multiple related VMs, the entire set of VMs may subsequently be restarted, effectively from the same point in time. In this manner, an entire system of multiple VMs may be consistently checkpointed at substantially the same point in time.

What is claimed is:

1. A method for generating a checkpoint for a virtual machine (VM) in a virtual computer system, the VM using a parent disk file and a set of VM memory, the method comprising:
creating a copy-on-write (COW) disk file pointing to the parent disk file in use by the VM;
stopping the VM, and while the VM is stopped:
marking the memory of the VM copy-on-write, the VM memory constituting original VM memory;
saving substantially all of the device state of the VM, including an instruction pointer, a plurality of registers and settings for one or more virtual devices, to memory; and
switching the VM to read from and write to the COW disk file instead of the parent disk file;
resuming operation of the VM, so that the VM reads from and writes to the COW disk file and so that the VM reads from, writes to, and executes code from the VM memory;
handling disk COW faults to the COW disk file;
handling memory COW faults to the original VM memory to generate copies of the original VM memory for read, write, and execution use by the VM;
saving the device state from memory to a checkpoint data store; and
saving the original VM memory to the checkpoint data store,
wherein the VM memory is a subset of a physical memory in the virtual computer system, the VM memory being a portion of the physical memory that is allocated to the VM.

2. The method of claim 1, wherein the VM is still running when the COW disk file is created.

3. The method of claim 1, further comprising copying the parent disk file after any pending disk writes complete, and using the copy of the parent disk file for the checkpoint.

4. The method of claim 3, further comprising committing the COW disk file into the original parent disk file.

5. The method of claim 4, wherein the step of committing the COW disk file into the original parent disk file comprises creating one or more new COW disk files for use by the VM while the COW disk file previously used by the VM is being committed.

6. The method of claim 3, wherein the copy of the parent disk file is indicated for use for the checkpoint by adding a disk file pointer to the checkpoint file.

7. The method of claim 1, wherein the steps of creating the COW disk file and handling disk COW faults are performed by a data storage device that is external to the virtual computer system.

8. The method of claim 1, wherein the step of saving the original VM memory to the checkpoint data store is delayed until all pending disk reads complete.

9. The method of claim 1, wherein the checkpoint data store comprises raw data stored in a data storage medium.

10. The method of claim 1, wherein the checkpoint data store comprises a file stored in a data storage medium.

11. The method of claim 10, wherein the data storage medium comprises a disk drive.

12. The method of claim 10, wherein the data storage medium comprises memory.

13. The method of claim 12, wherein the memory comprises high-speed random access memory.

14. The method of claim 12, wherein the memory comprises flash memory.

15. The method of claim 1, further comprising, after the operation of the VM is resumed, forcing memory COW faults on original VM memory that is affected by any new disk reads, prior to issuing the new disk reads.

16. The method of claim 1, wherein, if there is a pending read followed by a pending write to the same disk block, the resumption of the operation of the VM is delayed until all pending disk operations complete.

17. The method of claim 16, further comprising, if the resumption of the operation of the VM is not delayed until all pending disk operations complete, reissuing any disk reads that affect any VM memory for which a COW fault has occurred.

18. The method of claim 1, wherein, for the step of handling disk COW faults to the COW disk file, if there is a pending disk write to the same COW block group for which the disk COW fault has occurred, the handling of the disk COW fault and the write that caused the disk COW fault are delayed until the pending disk write completes.

19. A method for generating a checkpoint for a virtual machine (VM) in a virtual computer system, the VM using a virtual disk and a set of VM memory, the method comprising:
maintaining, in an unmodified state, the contents of the virtual disk at the time for which the checkpoint is generated, while allowing the VM to continue reading from and writing to the virtual disk;
saving substantially all of the device state of the VM, including an instruction pointer, a plurality of registers and settings for one or more virtual devices, at the time for which the checkpoint is generated, to a checkpoint data store; and
saving the set of VM memory, at the time for which the checkpoint is generated, to the checkpoint data store by performing the following steps:
marking the set of VM memory as copy-on-write (COW), the set of VM memory constituting original VM memory;
allowing the VM to continue reading from, writing to, and executing code from the VM memory;
responding to memory COW faults related to the VM memory by generating copies of the original VM memory for read, write, and execution use by the VM; and
saving the original VM memory to the checkpoint data store, wherein the VM memory is a subset of a physical memory in the virtual computer system, the VM memory being a portion of the physical memory that is allocated to the VM.

20. The method of claim 19, wherein the execution of the VM is stopped while the VM memory is marked COW.

21. The method of claim 19, wherein the virtual disk is initially mapped to a parent disk file on a physical disk and wherein the step of maintaining, in an unmodified state, the contents of the virtual disk comprises creating a copy-on-write (COW) disk file pointing to the parent disk file and mapping the virtual disk to the COW disk file.

22. The method of claim 19, wherein the step of saving the device state of the VM to the checkpoint data store comprises saving the device state to memory while the VM is not executing and copying the device state from memory to the checkpoint data store after the VM has resumed execution.

23. A method for generating a checkpoint for a virtual machine (VM) in a virtual computer system, the VM using a virtual disk and a set of VM memory, the method comprising:
   maintaining, in an unmodified state, the contents of the virtual disk at the time for which the checkpoint is generated, while allowing the VM to continue reading from and writing to the virtual disk, the unmodified contents of the virtual disk constituting a checkpointed virtual disk, and the contents of the virtual disk used by the VM constituting an ongoing virtual disk;
   saving substantially all of the device state of the VM, including an instruction pointer, a plurality of registers and settings for one or more virtual devices at the time for which the checkpoint is generated, to a checkpoint data store;
   saving the contents of the VM memory, at the time for which the checkpoint is generated, to the checkpoint data store, and allowing the VM to continue reading from, writing to, and executing code from the VM memory, the contents of the VM memory saved to the checkpoint data store constituting a checkpointed VM memory, and the contents of the VM memory as used by the VM constituting an ongoing VM memory; and
   allowing the VM to execute, including executing code from the VM memory, during at least a part of the time during which the checkpoint is being generated, and ensuring that the results of any pending disk writes are applied to both the checkpointed virtual disk and the ongoing virtual disk, that the results of any new disk writes are applied to the ongoing virtual disk, but not to the checkpointed virtual disk, that the results of any pending disk reads are applied to both the checkpointed VM memory and the ongoing VM memory, and that the results of any new disk reads are applied to the ongoing VM memory, but not to the checkpointed VM memory,
   wherein the VM memory is a subset of a physical memory in the virtual computer system, the VM memory being a portion of the physical memory that is allocated to the VM.

24. The method of claim 23, wherein the step of saving the contents of the VM memory to the checkpoint data store comprises:
   marking the set of VM memory as copy-on-write (COW), the set of VM memory constituting original VM memory;
   allowing the VM to continue reading from and writing to the VM memory;
   responding to memory COW faults related to the VM memory by generating copies of the original VM memory for read and write use by the VM; and
   saving the original VM memory to the checkpoint data store.

25. The method of claim 24, wherein the step of ensuring that the results of any pending disk reads are applied to the ongoing VM memory comprises reissuing any pending disk reads for which the results of the read were directed to original VM memory for which a COW fault has occurred, but directing the reissued disk reads to the corresponding copies of the original VM memory instead of the original VM memory.

26. The method of claim 24, wherein the step of ensuring that the results of any new disk reads are not applied to the checkpointed VM memory comprises forcing COW faults for any original VM memory that would otherwise be affected by the new disk reads.

27. The method of claim 23, wherein the virtual disk is initially mapped to a parent disk file on a physical disk and wherein the step of maintaining, in an unmodified state, the contents of the virtual disk comprises creating a copy-on-write (COW) disk file pointing to the parent disk file and mapping the virtual disk to the COW disk file.

28. The method of claim 27, wherein the step of ensuring that the results of any pending disk writes are applied to the ongoing virtual disk comprises, if there is a pending disk write to the same COW block group as a subsequent write for which a disk COW fault has occurred, delaying responding to the disk COW fault and delaying the subsequent write until the pending disk write completes.

* * * * *